United States Patent
Fujiwara

(10) Patent No.: US 10,298,899 B2
(45) Date of Patent: May 21, 2019

(54) IMAGE PROCESSING DEVICE, IMAGING DEVICE, IMAGE PROCESSING METHOD, AND PROGRAM

(71) Applicant: FUJIFILM Corporation, Tokyo (JP)

(72) Inventor: Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 107 days.

(21) Appl. No.: 15/276,251

(22) Filed: Sep. 26, 2016

(65) Prior Publication Data

US 2017/0013242 A1    Jan. 12, 2017

Related U.S. Application Data

(63) Continuation of application No. PCT/JP2015/057276, filed on Mar. 12, 2015.

(30) Foreign Application Priority Data

Mar. 31, 2014    (JP) .................................. 2014-071682

(51) Int. Cl.
*H04N 9/04* (2006.01)
*H04N 9/73* (2006.01)
(Continued)

(52) U.S. Cl.
CPC ........... *H04N 9/735* (2013.01); *H04N 5/2351* (2013.01); *H04N 5/2353* (2013.01);
(Continued)

(58) Field of Classification Search
CPC ...... H04N 9/735; H04N 1/6077; H04N 1/608; H04N 1/60; H04N 13/0025; H04N 9/3182;
(Continued)

(56) References Cited

U.S. PATENT DOCUMENTS

| 5,659,357 A * | 8/1997 | Miyano | H04N 9/735 |
| | | | 348/223.1 |
| 8,164,648 B2 * | 4/2012 | Takahashi | H04N 9/735 |
| | | | 348/223.1 |

(Continued)

FOREIGN PATENT DOCUMENTS

| CN | 102387372 A | 3/2012 |
| JP | 2005-33609 A | 2/2005 |

(Continued)

OTHER PUBLICATIONS

Chinese Office Action and Search Report for Chinese Application No. 201580017415.2, dated May 2, 2017, with an English translation of the Chinese Office Action.

(Continued)

*Primary Examiner* — Chia Wei A Chen
(74) *Attorney, Agent, or Firm* — Birch, Stewart, Kolasch & Birch, LLP

(57) ABSTRACT

The number of light sources of original image data and the types of light source are determined (S11). A reference white balance gain which is set for each light source type of the original image data is acquired (S12). An influence rate of each light source type is acquired for each pixel of the original image data and a mixture ratio of the reference white balance gains is acquired on the basis of the influence rate (S13). The reference white balance gains and the mixture ratio are stored in a storage medium so as to be associated with the original image data (S14). It is possible to acquire the white balance gain for each pixel required for multi-area white balance processing for the original image data from the reference white balance gains and the mixture ratio stored in the storage medium subsequently.

9 Claims, 20 Drawing Sheets

(51) Int. Cl.
   *H04N 5/225*  (2006.01)
   *H04N 5/232*  (2006.01)
   *H04N 5/235*  (2006.01)
   *H04N 5/243*  (2006.01)

(52) U.S. Cl.
   CPC ........... *H04N 5/2354* (2013.01); *H04N 5/243* (2013.01); *H04N 9/045* (2013.01); *H04N 5/2256* (2013.01); *H04N 5/23206* (2013.01)

(58) Field of Classification Search
   CPC . H04N 9/73; G09G 2320/0666; G01J 1/4204; G01J 2001/448
   See application file for complete search history.

(56) References Cited

U.S. PATENT DOCUMENTS

| | | | | |
|---|---|---|---|---|
| 2002/0054220 A1* | 5/2002 | Takeuchi | | H04N 9/735 348/223.1 |
| 2002/0118967 A1* | 8/2002 | Funston | | G03B 15/05 396/155 |
| 2004/0201766 A1* | 10/2004 | Funston | | H04N 5/2351 348/333.02 |
| 2004/0212691 A1* | 10/2004 | Sato | | H04N 9/735 348/223.1 |
| 2005/0219379 A1* | 10/2005 | Shi | | H04N 1/6086 348/223.1 |
| 2006/0159336 A1* | 7/2006 | Uezono | | H04N 9/735 382/167 |
| 2006/0170789 A1* | 8/2006 | Takahashi | | H04N 9/735 348/223.1 |
| 2006/0262197 A1* | 11/2006 | Uezono | | H04N 9/735 348/223.1 |
| 2007/0024719 A1* | 2/2007 | Sakurai | | H04N 9/735 348/223.1 |
| 2007/0139532 A1* | 6/2007 | Sakurai | | H04N 9/735 348/226.1 |
| 2007/0154203 A1* | 7/2007 | Takahashi | | H04N 5/2351 396/213 |
| 2007/0165960 A1* | 7/2007 | Yamada | | H04N 9/735 382/254 |
| 2007/0236715 A1* | 10/2007 | Hashimoto | | H04N 9/735 358/1.9 |
| 2008/0211925 A1* | 9/2008 | Misawa | | H04N 9/735 348/223.1 |
| 2008/0252749 A1* | 10/2008 | Fujiwara | | H04N 5/23219 348/224.1 |
| 2010/0214435 A1* | 8/2010 | Chang | | H04N 9/735 348/223.1 |
| 2010/0328487 A1* | 12/2010 | Furuya | | H04N 5/232 348/223.1 |
| 2011/0298947 A1* | 12/2011 | Guo | | H04N 5/2354 348/224.1 |
| 2012/0057044 A1* | 3/2012 | Shimizu | | H04N 9/735 348/223.1 |
| 2012/0313979 A1* | 12/2012 | Matsuura | | G09G 3/3413 345/690 |
| 2013/0155274 A1* | 6/2013 | Yoshino | | H04N 9/735 348/223.1 |
| 2014/0168466 A1* | 6/2014 | Yoshida | | H04N 9/735 348/224.1 |
| 2014/0176759 A1* | 6/2014 | Goto | | H04N 5/2354 348/224.1 |
| 2015/0029359 A1* | 1/2015 | Nenonen | | H04N 5/2354 348/224.1 |
| 2015/0172525 A1* | 6/2015 | Ishizaki | | H04N 9/735 348/223.1 |
| 2015/0279113 A1* | 10/2015 | Knorr | | G06T 19/006 345/633 |
| 2015/0326840 A1* | 11/2015 | Usui | | H04N 9/735 348/148 |
| 2016/0078317 A1* | 3/2016 | Gu | | G06K 9/0063 382/190 |
| 2016/0267850 A1* | 9/2016 | Tada | | G09G 3/3426 |

FOREIGN PATENT DOCUMENTS

| | | |
|---|---|---|
| JP | 2009-4895 A | 1/2009 |
| JP | 2010-187113 A | 8/2010 |
| JP | 2012-49600 A | 3/2012 |
| JP | 2012-165077 A | 8/2012 |

OTHER PUBLICATIONS

Chinese Office Action dated Nov. 16, 2017, for corresponding Chinese Application No. 201580017415.2.
International Search Report, issued in PCT/JP2015/057276 (PCT/ISA/210), dated May 12, 2015.
Written Opinion of the International Searching Authority, issued in PCT/JP2015/057276 (PCT/ISA/237), dated May 12, 2015.
Chinese Office Action for Chinese Application No. 201580017415.2, dated Jun. 7, 2018, with an English translation.

* cited by examiner

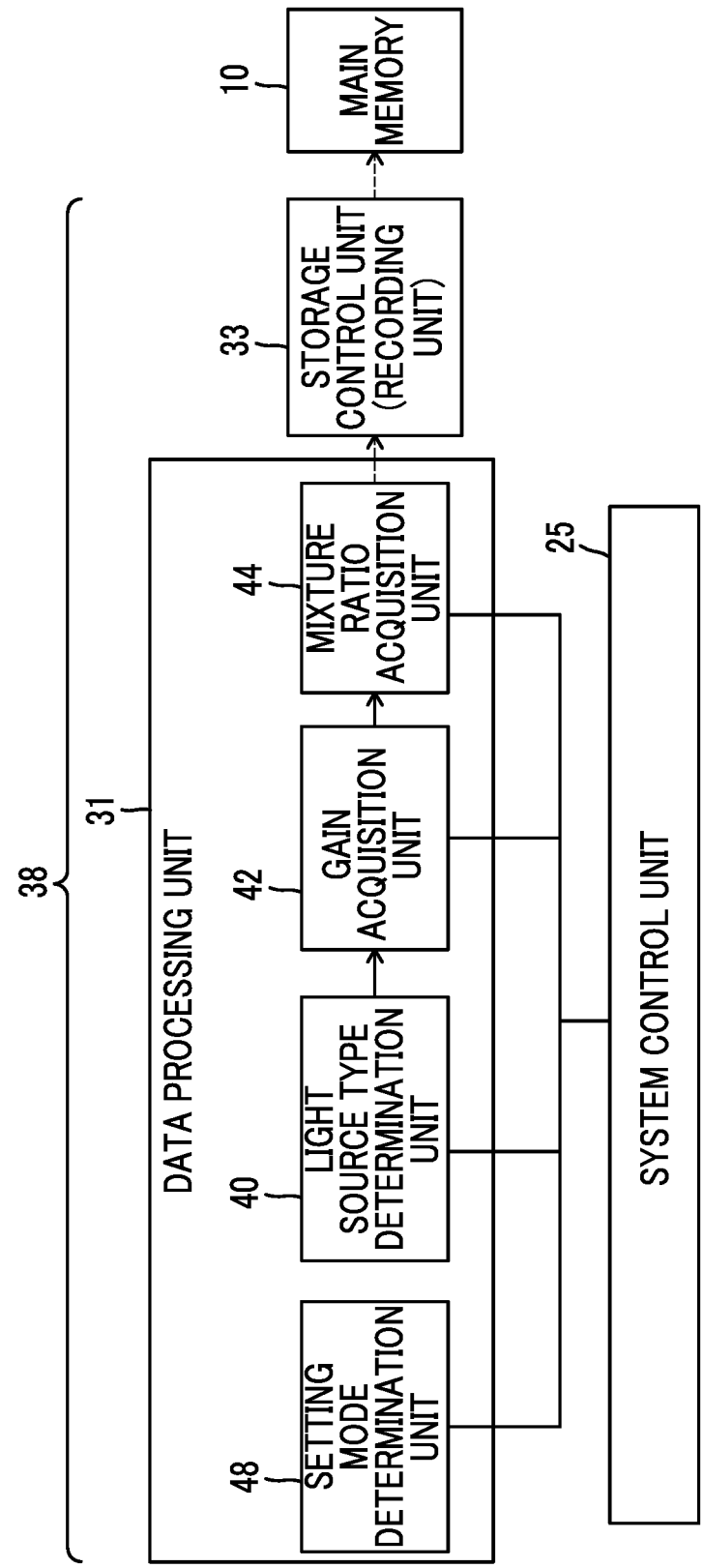

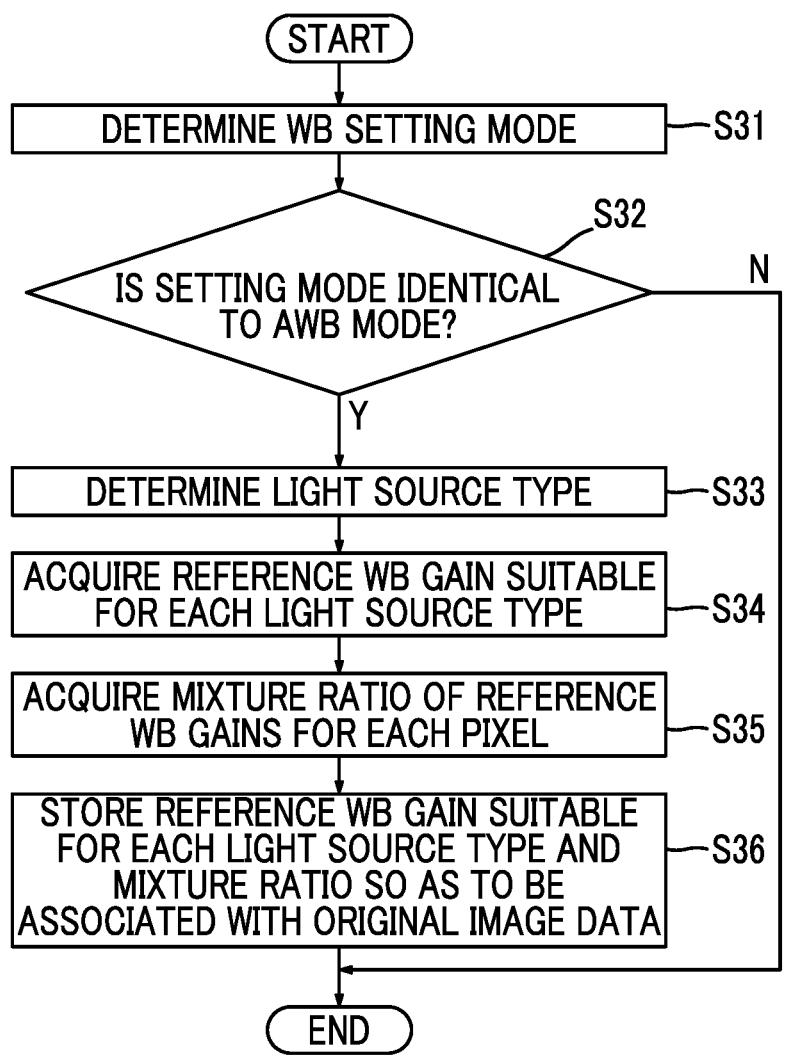

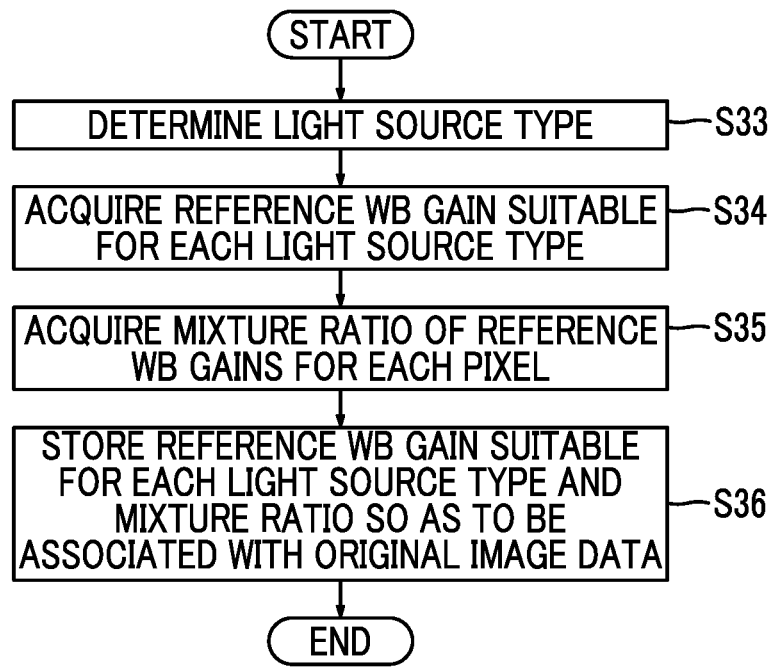
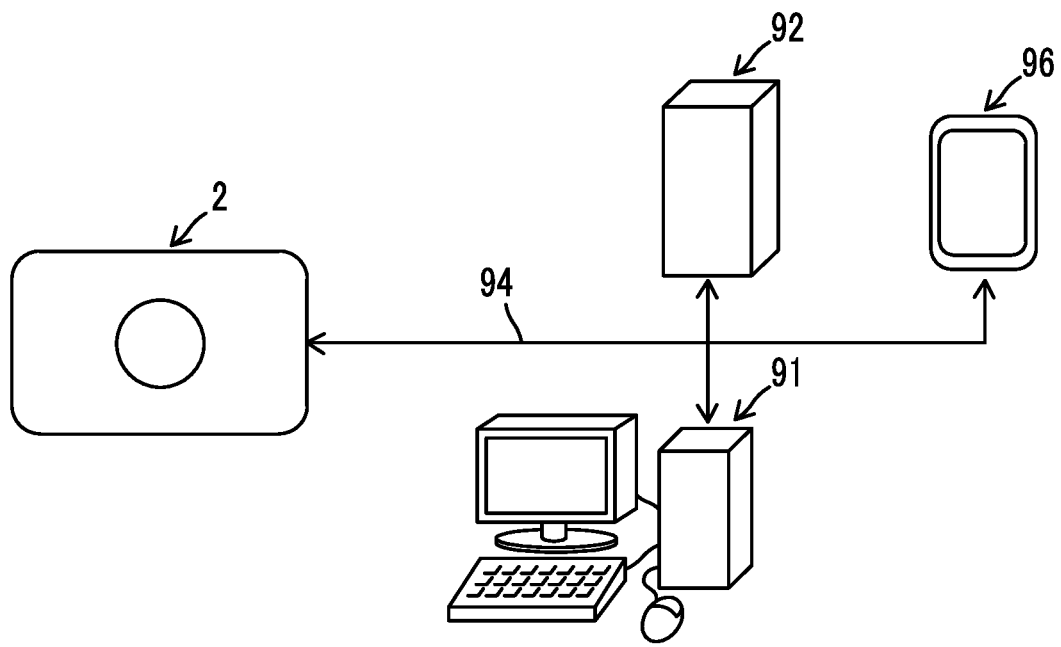

IMAGE PROCESSING DEVICE, IMAGING DEVICE, IMAGE PROCESSING METHOD, AND PROGRAM

CROSS-REFERENCE TO RELATED APPLICATIONS

This application is a Continuation of PCT International Application No. PCT/JP2015/057276 filed on Mar. 12, 2015, which claims priority under 35 U.S.C. § 119(a) to Japanese Patent Application No. 2014-71682 filed on Mar. 31, 2014. Each of the above applications is hereby expressly incorporated by reference, in their entirety, into the present application.

BACKGROUND OF THE INVENTION

1. Field of the Invention

The present invention relates to an image processing device, an imaging device, an image processing method, and a program, and more particularly, to a multi-area white balance processing technique.

2. Description of the Related Art

Multi-area white balance processing (hereinafter, referred to as "multi-area WB processing") is white balance processing (hereinafter, referred to as "WB processing") that applies different white balance gains (hereinafter, referred to as "WB gains") to each pixel or each area of one image. According to multi-area WB processing, even in an image of an object in which light components are emitted from a plurality of light sources to each pixel (each area) at different ratios, it is possible to accurately correct the color (color balance) of each pixel (each area).

For example, in a case in which flash light is emitted to capture a night portrait scene, an image of a person is captured while being affected by flash light (for example, light including a large amount of blue-wavelength light) and the background (night scene) of the captured image is not substantially affected by the flash light and is affected by other types of environmental light such as light from a sodium lamp (light including a large amount of red-wavelength light). In this case, it is necessary to apply a WB gain for cancelling the influence of flash light to the image of a person in order to obtain a good person image color (color balance) using WB processing. It is necessary to apply a WB gain for cancelling the influence of other types of environmental light to a background image in order to obtain a good background color (color balance). Therefore, in a case in which a common WB gain is applied to all of the pixels forming an image, it is difficult to obtain both a good person color (color balance) and a good background color (color balance).

However, according to multi-area WB processing, a WB gain applied to a person portion and a WB gain applied to a background portion in one image are changed. Therefore, for example, the WB gain applied to each pixel is optimized according to the amount of flash light that reaches the pixel to obtain both a good person color (color balance) and a good background color (color balance).

JP2012-165077A discloses a white balance control device that can prevent a variation in a white balance control value which is calculated using color information obtained from an object region. The white balance control device detects the object region from an image, divides the image into a plurality of regions, calculates color information indicating the representative colors of regions that overlap the object region, and determines a weight. Then, the white balance control device applies the weight determined for each region that overlaps the object region to each color information item, integrates the color information, and calculates a white balance control value at which the representative color becomes a target color from the integration result of the color information and information about a predetermined target color.

JP2010-187113A discloses an imaging device that can acquire an image adjusted to the color temperature desired by a user. The imaging device calculates a WB gain for background light on the basis of a preliminary image captured when flash light is not emitted, compares the brightness of the preliminary image with the brightness of a main image which is captured while flash light is emitted immediately after the preliminary image is captured, and calculates a WB gain for object light on the basis of the image data of a region of the main image in which the brightness difference is greater than a threshold value. Then, the imaging device calculates a plurality of different WB gains on the basis of the WB gain for the background light, the WB gain for the object light, and a predetermined WB gain for flash light and individually applies the plurality of WB gains to the main image to generate a plurality of bracket images with different color temperatures.

In some cases, image data and a WB gain are stored in order to adjust the white balance of an image after the image data is stored.

For example, an imaging device disclosed in JP2009-4895A stores accessory information required for a development process and RAW image data of a main image in a storage medium and can perform auto white balance adjustment when the development process is performed for the RAW image data.

SUMMARY OF THE INVENTION

As described above, since both the RAW image data and the accessory information required for a development process are stored, it is possible to adjust the white balance of the RAW image data subsequently.

However, in a case in which the white balance of image data, such as RAW image data, is adjusted subsequently, flexibility in the adjustment of the white balance is low.

For example, in some cases, in an image that is captured while flash light is emitted in a night portrait scene, the user "wants to slightly correct only a person portion to the red side". In this case, when the white balance of the entire screen is shifted, the colors (color balance) of both the person portion and a background portion are changed and it is difficult to meet the demand of the user.

In a case in which the user manually sets a WB gain for each pixel when the white balance is adjusted subsequently, it is possible to meet the demand of the user who "wants to slightly correct only an image portion to the red side". However, it takes a lot of time and effort to manually set the WB gain for each pixel, which is inefficient.

As such, in a case in which information about the individual WB gains set for each pixel is stored together with image data, such as RAW image data, in order to perform multi-area WB processing, it is possible to switch between the execution and non-execution of the multi-area WB processing subsequently. However, for example, it is difficult to simply meet the demand of the user who "wants to slightly correct only a person portion to the red side"

The invention has been made in view of the above-mentioned problems and an object of the invention is to provide a technique that can perform white balance adjustment with high flexibility even in a case in which multi-area WB processing is performed subsequently.

An aspect of the invention relates to an image processing device comprising: a light source type determination unit that determines the number of light sources of original image data and the types of light source; a gain acquisition unit that acquires a reference white balance gain which is set for each light source type of the original image data; a mixture ratio acquisition unit that acquires an influence rate of each light source type for each pixel of the original image data and acquires a mixture ratio of the reference white balance gains on the basis of the influence rate; and a recording unit that stores the reference white balance gains and the mixture ratio in a storage medium so as to be associated with the original image data.

According to this aspect, the reference white balance gains and the mixture ratio are stored so as to be associated with the original image data. Therefore, even in a case in which the original image data stored in the storage medium is read and multi-area WB processing is performed subsequently, it is possible to perform appropriate multi-area WB processing by reading the reference white balance gains and the mixture ratio from the storage medium and using the reference white balance gains and the mixture ratio. When the multi-area WB processing is performed subsequently, it is possible to adjust the reference white balance gains and the mixture ratio. Therefore, it is possible to perform white balance adjustment with high flexibility.

Preferably, the light source type determination unit determines that the light sources of the original image data are flash light and environmental light and the gain acquisition unit acquires a reference white balance gain for flash light which is set in a case in which the light source type is the flash light and a reference white balance gain for environmental light which is set in a case in which the light source type is the environmental light. Preferably, the mixture ratio acquisition unit acquires the influence rate of each of the flash light and the environmental light for each pixel of the original image data and acquires the mixture ratio of the reference white balance gain for flash light and the reference white balance gain for environmental light on the basis of the influence rate. Preferably, the recording unit stores the reference white balance gain for flash light, the reference white balance gain for environmental light, and the mixture ratio in the storage medium so as to be associated with the original image data.

According to this aspect, it is possible to perform appropriate multi-area WB processing for the original image data captured while flash light is emitted subsequently. Therefore, it is possible to perform white balance adjustment with high flexibility.

Preferably, the image processing device further comprises a flash image acquisition unit that acquires flash emission image data which is captured while flash light is emitted and flash non-emission image data which is captured when flash light is not emitted. Preferably, the mixture ratio acquisition unit acquires the influence rate of each of the flash light and the environmental light from the flash emission image data and the flash non-emission image data and acquires the mixture ratio of the reference white balance gain for flash light and the reference white balance gain for environmental light on the basis of the influence rate.

According to this aspect, it is possible to perform multi-area WB processing considering the influence rate of the flash light and the environmental light subsequently.

Preferably, the mixture ratio acquisition unit acquires a first brightness value of each pixel of the flash non-emission image data, acquires a second brightness value of each pixel of the flash emission image data, acquires the influence rate of each of the flash light and the environmental light on the basis of the first brightness value and the second brightness value, and acquires the mixture ratio of the reference white balance gain for flash light and the reference white balance gain for environmental light on the basis of the influence rate.

According to this aspect, it is possible to accurately calculate the mixture ratio of the reference white balance gain for flash light and the reference white balance gain for environmental light on the basis of the brightness values (the first brightness value and the second brightness value) of the flash emission image data and the flash non-emission image data.

Preferably, the original image data is the flash emission image data.

According to this aspect, it is possible to perform multi-area WB processing for the flash emission image data subsequently.

Preferably, the image processing device further comprises a light source type data acquisition unit that acquires first image data indicating an influence of a first light source type and second image data indicating an influence of a second light source type. Preferably, in a case in which the light source types of the original image data determined by the light source type determination unit include the first light source type and the second light source type, the gain acquisition unit acquires the reference white balance gain set for the first light source type and the reference white balance gain set for the second light source type and the mixture ratio acquisition unit acquires the influence rate of the first light source type and the second light source type from the first image data and the second image data and acquires the mixture ratio of the reference white balance gain set for the first light source type and the reference white balance gain set for the second light source type on the basis of the influence rate. Preferably, the recording unit stores the reference white balance gain set for the first light source type, the reference white balance gain set for the second light source type, and the mixture ratio in the storage medium so as to be associated with the original image data.

According to this aspect, it is possible to perform multi-area WB processing considering the influence rate of the first light source type and the second light source type subsequently.

Preferably, regardless of a white balance setting mode when the original image data is acquired, the light source type determination unit determines the number of light sources of the original image data and the types of light source, the gain acquisition unit acquires the reference white balance gain set for each light source type, the mixture ratio acquisition unit acquires the influence rate of each light source type for each pixel of the original image data and acquires the mixture ratio of the reference white balance gains on the basis of the influence rate, and the recording unit stores the reference white balance gains and the mixture ratio in the storage medium so as to be associated with the original image data.

According to this aspect, the reference white balance gains and the mixture ratio are stored in the storage medium so as to be associated with the original image data, regardless of the white balance setting mode when the original image data is acquired. Therefore, the user can perform multi-area WB processing for the original image data subsequently, regardless of the white balance setting mode when the original image data is acquired.

Preferably, the image processing device further comprises a setting mode determination unit that determines a white balance setting mode when the original image data is acquired. Preferably, only in a case in which the white balance setting mode determined by the setting mode determination unit is an auto white balance mode in which a white balance gain applied to the original image data is determined on the basis of color distribution information of the original image data, the light source type determination unit determines the number of light sources of the original image data and the types of light source, the gain acquisition unit acquires the reference white balance gain set for each light source type, the mixture ratio acquisition unit acquires the influence rate of each light source type for each pixel of the original image data and acquires the mixture ratio of the reference white balance gains on the basis of the influence rate, and the recording unit stores the reference white balance gains and the mixture ratio in the storage medium so as to be associated with the original image data.

According to this aspect, only in a case in which the white balance setting mode when the original image data is acquired is the auto white balance mode, it is possible to perform multi-area WB processing for the original image data subsequently.

The "auto white balance mode" is a mode in which the original image data is analyzed to determine a white balance gain and a method for determining the white balance gain is not particularly limited.

Another aspect of the invention relates to an image processing device comprising: a processed data acquisition unit that acquires original image data, a reference white balance gain which is set for each light source type of the original image data, and a mixture ratio of the reference white balance gains set for each pixel of the original image data from a storage medium; and a gain calculation unit that calculates an application white balance gain for each pixel of the original image data from the reference white balance gains according to the mixture ratio.

According to this aspect, it is possible to accurately calculate the application white balance gain applied to the original image data. Therefore, it is possible to perform multi-area WB processing for the original image data subsequently.

Preferably, the reference white balance gains acquired by the processed data acquisition unit include a reference white balance gain for flash light which is set in a case in which the light source type is flash light and a reference white balance gain for environmental light which is set in a case in which the light source type is environmental light and the mixture ratio acquired by the processed data acquisition unit is a mixture ratio of the reference white balance gain for flash light and the reference white balance gain for environmental light which are set for each pixel of the original image data. Preferably, the gain calculation unit calculates the application white balance gain for each pixel of the original image data from the reference white balance gain for flash light and the reference white balance gain for environmental light according to the mixture ratio.

According to this aspect, it is possible to perform multi-area WB processing considering the influence of flash light and environmental light subsequently.

Preferably, the image processing device further comprises: a setting mode acquisition unit that acquires information about a white balance setting mode when the original image data is acquired; and a processing mode acquisition unit that acquires information about a white balance processing mode for the original image data. Preferably, the gain calculation unit calculates the application white balance gain on the basis of the reference white balance gain acquired from the storage medium in a case in which the white balance processing mode is determined to be the same as the white balance setting mode on the basis of the information about the white balance setting mode and the information about the white balance processing mode, acquires the reference white balance gain which is set on the basis of the white balance processing mode in a case in which the white balance processing mode is determined to be different from the white balance setting mode, and calculates the application white balance gain on the basis of the reference white balance gain.

According to this aspect, even in a case in which the white balance setting mode when the original image data is acquired is different from the white balance processing mode which is intended when multi-area WB processing is performed for the original image data, it is possible to perform multi-area WB processing in which the intended white balance processing mode is reflected.

The "white balance processing mode" may be determined by any method or the user may determine the white balance processing mode. Alternatively, the image processing device may determine the white balance processing mode on the basis of various conditions.

Preferably, the image processing device further comprises: a light source type designation unit that receives a light source type designated by a user; and a designated gain acquisition unit that acquires a reference white balance gain set for the light source type designated by the user which is received by the light source type designation unit. Preferably, the gain calculation unit replaces at least some of the reference white balance gains set for each light source type of the original image data with the reference white balance gain acquired by the designated gain acquisition unit and calculates the application white balance gain according to the mixture ratio.

According to this aspect, it is possible to perform multi-area WB processing in which the light source type designated by the user is reflected.

Preferably, the image processing device further comprises a white balance processing unit that applies the application white balance gain to the original image data to acquire white-balance-adjusted image data.

According to this aspect, it is possible to acquire the white-balance-adjusted image data subjected to multi-area WB processing.

Preferably, the image processing device further comprises a display control unit and a display unit that is controlled by the display control unit. Preferably, the display control unit displays an image based on the white-balance-adjusted image data on the display unit.

According to this aspect, the user can simply check the image based on the white-balance-adjusted image data through the display unit.

Preferably, the display control unit is connected to an operating unit that is operated by the user, displays a light source display portion indicating the light source type of the original image data on the display unit, and displays a plurality of light source display portions which are provided for each light source type on the display unit in a case in which there are a plurality of light source types in the original image data. Preferably, in a case in which the plurality of light source display portions are displayed on the display unit, when the user operates the operating unit to designate any one of the plurality of light source display portions, the display control unit displays a portion of or the entire image displayed on the display unit so as to be highlighted according to an influence rate of a light source corresponding to the light source display portion designated through the operating unit.

According to this aspect, the user can simply check the magnitude of the influence rate of a desired light source through the image that is displayed on the display unit so as to be highlighted.

Preferably, the display control unit displays a pixel, which is more affected by the light source corresponding to the light source display portion that is designated by the user through the operating unit than by other types of light sources among the light sources of the original image data, among pixels of the image on the display unit so as to be highlighted.

According to this aspect, the user can simply check an image portion, which is more affected by a desired light source than by other types of light source, through the image that is displayed on the display unit so as to be highlighted.

Preferably, the display control unit displays a pixel, on which the influence rate of the light source corresponding to the light source display portion that is designated by the user through the operating unit is higher than a first rate, among the pixels of the image on the display unit so as to be highlighted.

According to this aspect, the user can simply check an image portion, on which the influence rate of a desired light source is high, through the image that is displayed on the display unit so as to be highlighted.

The "first rate" is not particularly limited. For example, the "first rate" may be a predetermined value, such as "50%", or may be appropriately set according to, for example, the number of light sources of the original image data and the types of light source.

Preferably, the image processing device further comprises a white balance adjustment unit that adjusts a white balance of the image. Preferably, the display control unit is connected to an operating unit that is operated by the user, displays a light source display portion indicating the light source type of the original image data on the display unit, and displays a plurality of light source display portions which are provided for each light source type on the display unit in a case in which there are a plurality of light source types in the original image data. Preferably, in a case in which the plurality of light source display portions are displayed on the display unit, when the user operates the operating unit to designate any one of the plurality of light source display portions, the display control unit displays a change display portion for receiving a change in the white balance based on the light source corresponding to the light source display portion which is designated through the operating unit on the display unit. Preferably, the display control unit receives the change in the white balance of the image through the change display portion in response to an operation of the user through the operating unit. Preferably, when the display control unit receives the change in the white balance, the white balance adjustment unit adjusts the white balance of the image and reflects the change in the image and the display control unit displays the image of which the white balance has been adjusted by the white balance adjustment unit on the display unit.

According to this aspect, the user can simply check the image, of which the white balance related to the light source designated by the user through the light source display portion displayed on the display unit has been changed and adjusted, through the display unit.

Preferably, the image processing device further comprises a white balance adjustment unit that adjusts a white balance of the image. Preferably, the display control unit is connected to an operating unit that is operated by the user, displays a light source display portion indicating the light source type of the original image data on the display unit, and displays a plurality of light source display portions which are provided for each light source type on the display unit in a case in which there are a plurality of light source types in the original image data. Preferably, in a case in which the plurality of light source display portions are displayed on the display unit, when the user operates the operating unit to designate any one of the plurality of light source display portions, the display control unit displays a change display portion for receiving a change in an influence rate of the light source corresponding to the light source display portion which is designated through the operating unit in the image on the display unit. Preferably, the display control unit receives an amount of change in the influence rate in the image through the change display portion in response to an operation of the user through the operating unit and the white balance adjustment unit adjusts the white balance of the image and reflects the amount of change in the influence rate which has been received by the display control unit through the change display portion in the image. Preferably, the display control unit displays the image of which the white balance has been adjusted by the white balance adjustment unit on the display unit.

According to this aspect, the user can simply check the image, of which the white balance related to the light source designated by the user has been changed and adjusted, through the display unit.

Preferably, the white balance setting mode is any one of a preset white balance mode in which the white balance gain is preset, an auto white balance mode in which the white balance gain applied to the original image data is determined on the basis of color distribution information of the original image data, and a custom white balance mode in which the white balance gain applied to the original image data is determined on the basis of color distribution information of reference image data which is different from the original image data.

Preferably, the original image data is RAW image data.

According to this aspect, for example, it is possible to acquire white-balance-adjusted image data when the original image data (RAW image data) is developed.

Preferably, the original image data is uncompressed image data.

Preferably, the original image data is reversibly compressed image data.

Preferably, the original image data is irreversibly compressed image data.

It is possible to acquire white-balance-adjusted image data from the original image data.

Still another aspect of the invention relates to an imaging device comprising an imaging element and the above-mentioned image processing device. The original image data is acquired by the imaging element.

Yet another aspect of the invention relates to an image processing method comprising: determining the number of light sources of original image data and the types of light source; acquiring a reference white balance gain which is set for each light source type of the original image data; acquiring an influence rate of each light source type for each pixel of the original image data and acquiring a mixture ratio of the reference white balance gains on the basis of the influence rate; and storing the reference white balance gains and the mixture ratio in a storage medium so as to be associated with the original image data.

Still yet another aspect of the invention relates to an image processing method comprising: acquiring original image data, a reference white balance gain which is set for each light source type of the original image data, and a mixture ratio of the reference white balance gains set for each pixel of the original image data from a storage medium; and calculating an application white balance gain for each pixel of the original image data from the reference white balance gains according to the mixture ratio.

Yet still another aspect of the invention relates to a program that causes a computer to perform: a step of determining the number of light sources of original image data and the types of light source; a step of acquiring a reference white balance gain which is set for each light source type of the original image data; a step of acquiring an influence rate of each light source type for each pixel of the original image data and acquiring a mixture ratio of the reference white balance gains on the basis of the influence rate; and a step of storing the reference white balance gains and the mixture ratio in a storage medium so as to be associated with the original image data.

Still yet another aspect of the invention relates to a program that causes a computer to perform: a step of acquiring original image data, a reference white balance gain which is set for each light source type of the original image data, and a mixture ratio of the reference white balance gains set for each pixel of the original image data from a storage medium; and a step of calculating an application white balance gain for each pixel of the original image data from the reference white balance gains according to the mixture ratio.

According to the invention, it is possible to accurately perform multi-area WB processing for the original image data subsequently, using the reference white balance gains and the mixture ratio stored in the storage medium. In addition, when multi-area WB processing is performed subsequently, it is possible to adjust the reference white balance gains and the mixture ratio. Therefore, it is possible to perform white balance adjustment with high flexibility.

BRIEF DESCRIPTION OF THE DRAWINGS

FIG. 8 is a block diagram illustrating an example of the functional structure of an image processing unit according to a third embodiment.

FIG. 9 is a flowchart illustrating the flow of image processing according to the third embodiment.

FIG. 10 is a flowchart illustrating the flow of image processing according to a fourth embodiment.

FIG. 11 is a conceptual diagram illustrating the connection among a digital camera, a computer, a server, and a portable terminal through a network.

DESCRIPTION OF THE PREFERRED EMBODIMENTS

Embodiments of the invention will be described with reference to the drawings. In the following embodiments, an example in which the invention is applied to a digital camera (imaging device) will be described. However, the invention can be applied to an image processing device, an imaging device, an image processing method, and a program, in addition to the digital camera.

Figure 1:
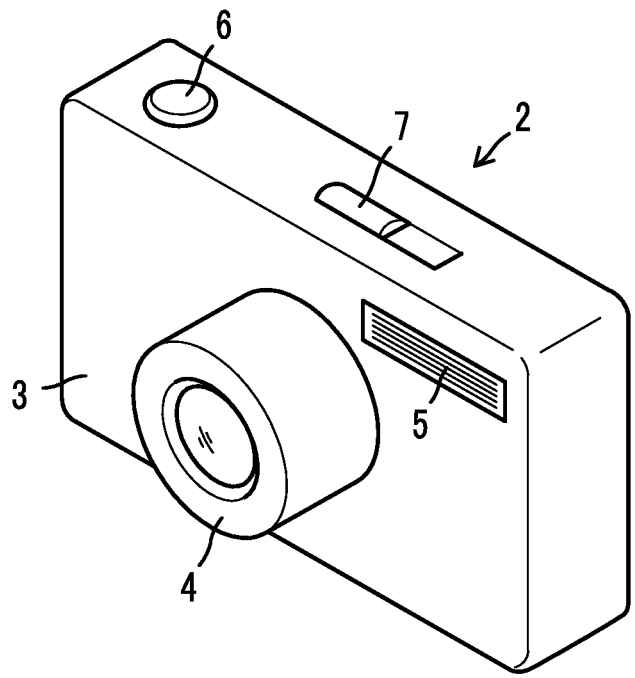
FIG. 1 is a front perspective view illustrating a digital camera.
Figure 2:
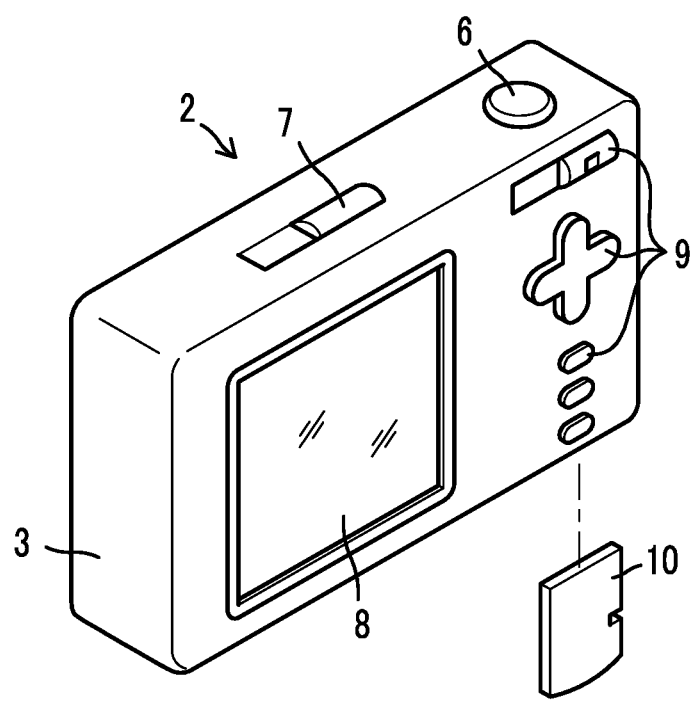
FIG. 2 is a rear perspective view illustrating the digital camera.

FIG. 1 is a front perspective view illustrating a digital camera 2 and FIG. 2 is a rear perspective view illustrating the digital camera 2.

The digital camera 2 comprises a camera body 3 and a lens barrel 4 that is attached to a front surface of the camera body 3. The lens barrel 4 and the camera body 3 may be integrally provided or may be detachably provided as an interchangeable lens camera.

In addition to the lens barrel 4, a flash light emitting unit 5 is provided on the front surface of the camera body 3. A shutter button 6 and a power switch 7 are provided on an upper surface of the camera body 3. The shutter button 6 is an imaging instruction unit that receives an imaging instruction from a user. The power switch 7 is a power switching unit that receives an instruction to turn on and off the digital camera 2 from the user.

A display unit 8 which is, for example, a liquid crystal panel and an operating unit 9 which is directly operated by the user are provided on a rear surface of the camera body 3. The display unit 8 displays a live view image (through image) in an imaging standby state to function as an electronic viewfinder and functions as a reproduction image display unit when a captured image or a memory-stored image is reproduced.

The operating unit 9 is an arbitrary operating device, such as a mode switch, a cross key, and an execution key. For example, the mode switch is operated by the user to switch the operation mode of the digital camera 2. Examples of the operation mode of the digital camera 2 include an imaging mode in which an image of an object is captured to obtain a captured image and a playback mode in which an image is played back and displayed. Examples of the imaging mode include an auto focus (AF) mode in which auto focus is performed and a manual focus (MF) mode in which a manual focus operation is performed. The cross key and the execution key are operated by the user to display a menu screen or a setting screen on the display unit 8, to move a cursor displayed on the menu screen or the setting screen, or to confirm various types of settings of the digital camera 2.

A memory slot into which a main memory 10 is inserted and a cover that opens and closes an opening of the memory slot are provided at the bottom (not illustrated) of the camera body 3. The main memory 10 is detachably provided in the camera body 3. When the main memory 10 is inserted into the camera body 3, it is electrically connected to a storage control unit 33 provided in the camera body 3. The main memory 10 can be generally a semiconductor memory, such as a card-type flash memory. The main memory 10 is not particularly limited. For example, a recording medium of an arbitrary storage type, such as a magnetic medium, can be used as the main memory 10.

Figure 3:
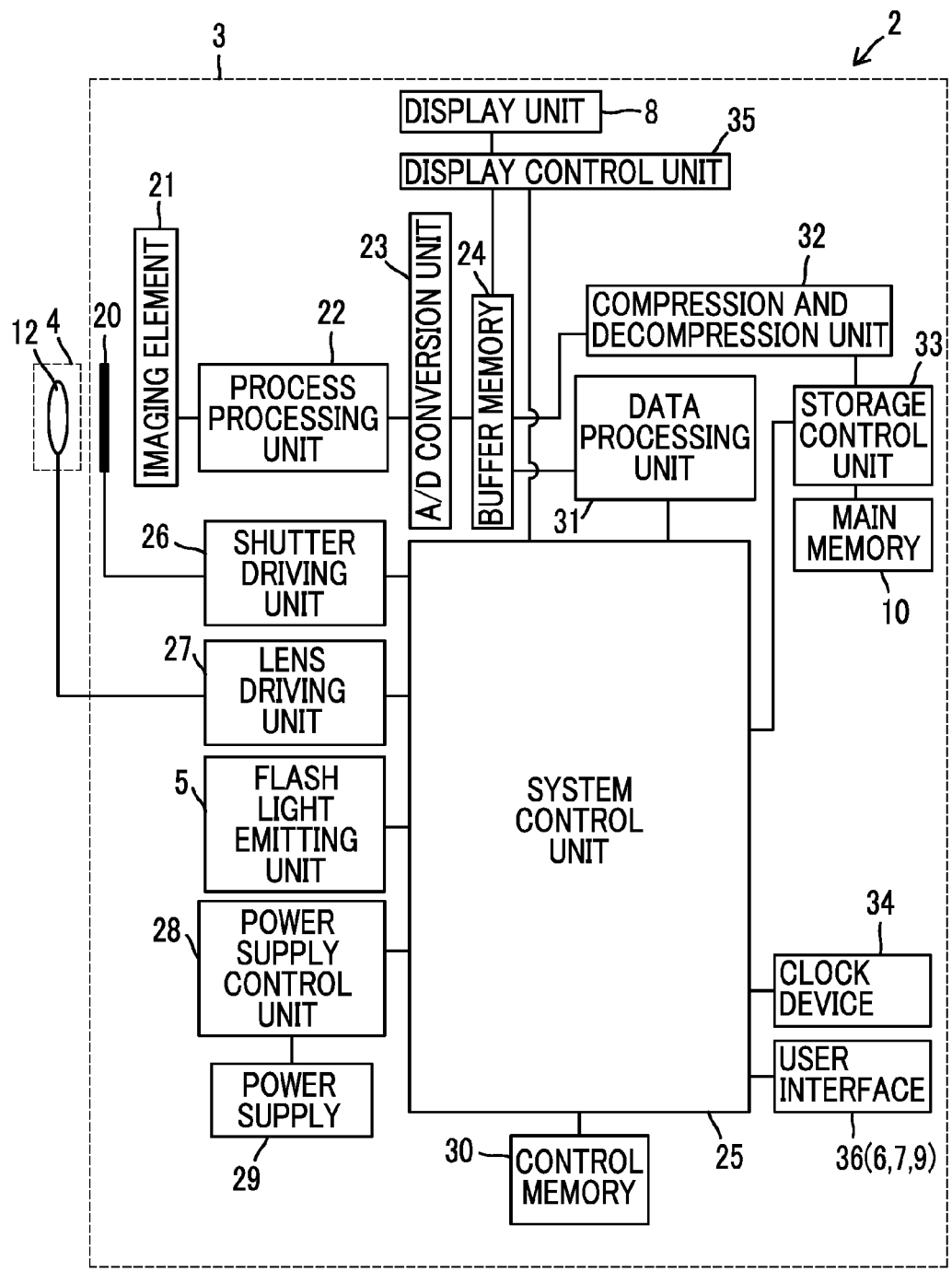
FIG. 3 is a block diagram illustrating a control processing system of the digital camera.

FIG. 3 is a block diagram illustrating a control processing system of the digital camera 2.

Object light passes through a lens unit 12 that is provided in the lens barrel 4 and a mechanical shutter 20 that is provided in the camera body 3 and is received by an imaging element 21. The imaging element 21 is an element that receives the object image and generates image data and includes color filters, such as red, green, and blue (R, G, and B) filters, and an image sensor, such as a charge coupled device (CCD) or a complementary metal oxide semiconductor (CMOS), which converts an optical image into an electric signal. For example, an automatic gain control (AGC) circuit of a process processing unit 22 performs process processing for image data that is output from the imaging element 21 and an A/D conversion unit 23 converts analog image data into digital image data. The digital image data is stored in a buffer memory 24.

The buffer memory 24 is an area that temporarily stores the image data and is, for example, a dynamic random access memory (DRAM). The image data that has been transmitted from the A/D conversion unit 23 and then stored in the buffer memory 24 is read by a data processing unit 31 which is controlled by a system control unit 25. The data processing unit 31 performs various types of image processing, such as a gamma correction process and a demosaic process, using the image data generated by the imaging element 21 as input image data, and stores the image data subjected image processing in the buffer memory 24 again.

The image data which has been subjected to the image processing by the data processing unit 31 and then stored in the buffer memory 24 is read by a display control unit 35 and a compression and decompression unit 32. The display control unit 35 controls the display unit 8 such that the image data read from the buffer memory 24 is displayed on the display unit 8. As such, the image data which has been output from the imaging element 21 and then subjected to the image processing by the data processing unit 31 is displayed as an imaging check image (post-view image) on the display unit 8.

The compression and decompression unit 32 compresses the image data read from the buffer memory 24 to create image data with an arbitrary compression format, such as Joint Photographic Experts Group (JPEG) or Tagged Image File Format (TIFF). The compressed image data is stored in the main memory 10 by the storage control unit 33 that controls a process of storing data in the main memory (storage medium) 10 and a process of reading data from the main memory 10. In a case in which a data type, such as image data, is stored in the main memory 10, the storage control unit 33 adds imaging information, such as editing date and time information (update date and time information), or other kinds of related information to the data type, on the basis of date and time information acquired from a clock device 34 which will be described below. The imaging information is added to the image data in any format. For example, an exchangeable image file format (Exif) can be used.

In the playback mode in which the image data stored in the main memory 10 is played back, the image data stored in the main memory 10 is read by the storage control unit 33 that is controlled by the system control unit 25, is decompressed by the compression and decompression unit 32, and is then stored in the buffer memory 24. The image data is read from the buffer memory 24 by the display control unit 35 and is played back and displayed on the display unit 8 in the same order as that in which a captured image is checked and displayed.

As described above, the system control unit 25 controls the buffer memory 24, the data processing unit 31, and the storage control unit 33. In addition, the system control unit 25 controls other units in the digital camera 2. For example, the system control unit 25 controls a lens driving unit 27 such that the driving of the lens unit 12 is controlled and controls a shutter driving unit 26 such that the driving of the mechanical shutter 20 is controlled. In addition, the system control unit 25 controls the imaging element 21 such that the output of the image data is controlled. Further, the system control unit 25 controls the flash light emitting unit 5 such that the emission or non-emission of flash light is controlled, and controls a power control unit 28 such that, for example, whether a battery is mounted on a power supply 29, the type of battery, and a remaining battery level are detected. Furthermore, the system control unit 25 acquires the date and time information which is counted by the clock device 34 and uses the date and time information in various types of processes. In addition, the system control unit 25 controls various processing units forming the data processing unit 31.

The system control unit 25 acquires an operation signal from a user interface 36 including the shutter button 6, the power switch 7, and the operating unit 9 and performs various types of processes and device control corresponding to the operation signal. For example, the system control unit 25 controls the shutter driving unit 26 such that the opening and closing of the mechanical shutter 20 is controlled in response to a release signal received from the shutter button 6. Furthermore, the system control unit 25 controls the power control unit 28 such that the turn-on and tune-off of the power supply 29 are controlled in response to a power on/off signal received from the power switch 7.

Programs or data types required for various types of processes and device control performed by the system control unit 25 are stored in a control memory 30. The system control unit 25 can read the programs or the data types stored in the control memory 30, if necessary. In addition, the system control unit 25 can store a new program or a new data type in the control memory 30. For example, the system control unit 25 can write condition data, such as the type of set white balance mode (hereinafter, referred to as a "WB mode") or a white balance gain, to the control memory 30. The system control unit 25 can control the display control unit 35 such that various kinds of information acquired from each unit are displayed on the display unit 8. In addition, the system control unit 25 can change various kinds of information to be displayed on the display unit 8, in response to an operation signal which is input from the user through the user interface 36.

Next, for white balance processing for the original image data acquired by the imaging element 21, an example of image processing will be described.

In each of the following embodiments, an example in which "RAW image data" that has been output from the imaging element 21 and passed through the process processing unit 22 (process processing) and the A/D conversion unit 23 (A/D conversion process) is input to the data processing unit 31 through the buffer memory 24 and is used as original image data will be described. Therefore, the demosaic process of the data processing unit 31 for the following original image data (RAW image data) is skipped. The original image data is not limited to the "RAW image data" and the same image processing can be performed for image data with any other formats, such as a JPEG format and TIFF.

In general, there is a type of digital camera that can store RAW image data which is "image data before image quality processing" or "image data subjected to only image quality processing (for example, lens shading correction) caused by an imaging system" in a storage medium (main memory 10), instead of or in addition to a processed image such as a JPEG image subjected to image quality processing. The storage of the RAW image data makes it possible for the user to perform image quality processing and a development process for the RAW image data subsequently, using RAW development software, and to obtain images with different image qualities, without taking a picture again. In a case in which the RAW image data is stored in the storage medium, the digital camera also stores information (for example, information about imaging conditions and the type of digital camera) required to develop the RAW image data in the storage medium. A method for storing the "RAW image data" and "information data required for development" is not particularly limited. Data in which information data required for development or other information is added as tag information (meta data) to the "RAW image data" may be stored in the storage medium. In the following embodiments, data in which tag information (meta data) is added to RAW image data is referred to as "RAW data".

A compression format of the original image data to be stored in the main memory 10 is not particularly limited. The original image data may be uncompressed image data, reversibly-compressed image data, or irreversibly-compressed image data. In a case in which the original image data is RAW image data, a development process may be performed before WB processing (see a "white balance processing unit (WB processing unit) 64" which will be described below) or after the WB processing. In a case in which the original image data is compressed image data (reversibly-compressed image data or irreversibly-compressed image data), it is preferable that a decompression process is performed before WB processing (see the "WB processing unit 64" which will be described below). The development process and the decompression process may be performed by, for example, a processed data acquisition unit 60 which will be described below.

First Embodiment

This embodiment relates to a processing structure for implementing multi-area WB processing that mixes a plurality of WB gains (reference white balance gains (hereinafter, referred to as "reference WB gains")) at different mixture ratios for each pixel to acquire a WB gain (application white balance gain (hereinafter, referred to as an "application WB gain")) suitable for each pixel. In particular, in this embodiment, the main memory (storage medium) 10 does not store the "WB gain (application WB gain) suitable for each pixel", but stores "a plurality of WB gains (reference WB gains)" used to acquire the "WB gain (application WB gain) suitable for each pixel" and a "mixture ratio for each pixel".

Figure 4:
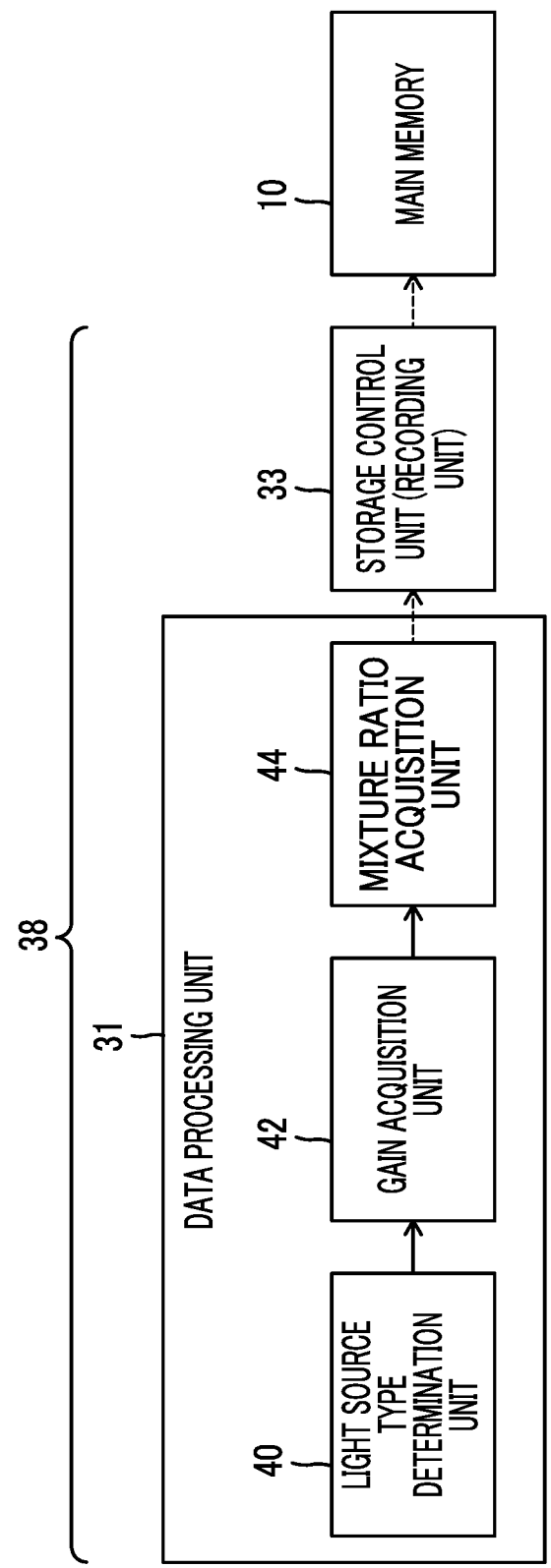
FIG. 4 is a block diagram illustrating an example of the functional structure of an image processing unit according to a first embodiment.

FIG. 4 is a block diagram illustrating an example of the functional structure of an image processing unit 38 according to a first embodiment.

The image processing unit 38 according to this embodiment includes a data processing unit 31 and a storage control unit 33. The data processing unit 31 includes a light source type determination unit 40, a gain acquisition unit 42, and a mixture ratio acquisition unit 44.

The light source type determination unit 40 determines the number of light sources of the original image data and the types of light source. A method for determining the number of light sources of the original image data and the types of light source is not particularly limited. for example, in a case in which flash light and environmental light are assumed as the light source type, the light source type determination unit 40 may acquire information about whether flash light is emitted from the system control unit 25 that controls the flash light emitting unit 5 to determine the number of light sources of the original image data and the types of light source. Whether flash light is emitted is set by the user through the user interface 36 or is determined by the system control unit 25 on the basis of the detection result of a photometric sensor (not illustrated) that detects the brightness of a captured scene. In both cases, the system control unit 25 has information about whether flash light is emitted. Therefore, in a case in which environmental light and flash light are assumed as the light source type, the light source type determination unit 40 may acquire the information about whether flash light is emitted from the system control unit 25 and determine the number of light sources of the original image data and the types of light source.

The gain acquisition unit 42 acquires a reference WB gain that is set for each light source type of the original image data. For example, for the light source type of flash light, the WB gain related to the flash light can be predetermined and stored in a memory such as the control memory 30. The gain acquisition unit 42 may acquire the predetermined WB gain for flash light as the reference WB gain from the memory.

For the light source type of environmental light, the gain acquisition unit 42 may analyze, for example, the original image data to acquire color distribution information or brightness distribution information, estimate a WB gain suitable for the environmental light from the color distribution information or the brightness distribution information, and acquire the WB gain as the reference WB gain.

The mixture ratio acquisition unit 44 acquire the influence rate of each light source type for each pixel of the original image data and acquires the mixture ratio of the reference WB gains on the basis of the influence rate. Here, the "influence rate" is calculated by any method. For example, the original image data can be analyzed to calculate the "influence rate". In a second embodiment which will be described below, the influence rate is acquired on the basis of a "brightness value" obtained by analyzing image data and the mixture ratio of the reference WB gains is acquired on the basis of the influence rate.

The storage control unit 33 functions as a recording unit that stores the reference WB gains and the mixture ratio in the main memory (storage medium) 10 so as to be associated with the original image data. The original image data is output from the mixture ratio acquisition unit 44 (data processing unit 31), is transmitted to the storage control unit 33 through the buffer memory 24 and the compression and decompression unit 32 (see FIG. 3), and is stored in the main memory 10. In a case in which the original image data to be stored in the main memory 10 is compressed image data (reversibly compressed image data or irreversibly compressed image data), the compression and decompression unit 32 performs a compression process corresponding to a compression format. In a case in which the original image data is uncompressed image data, the compression process of the compression and decompression unit 32 is skipped.

Figure 5:
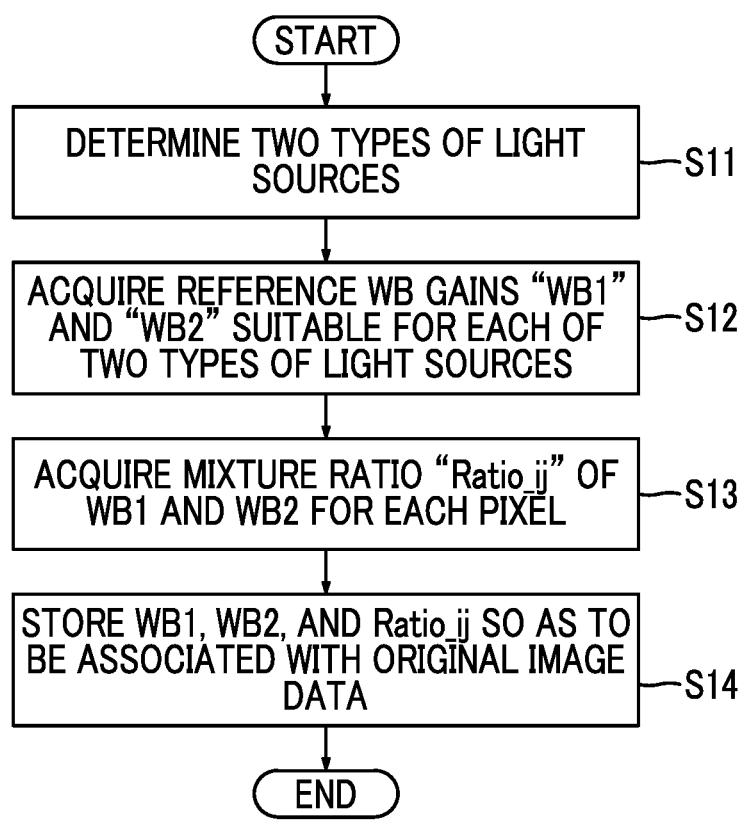
FIG. 5 is a flowchart illustrating the flow of image processing according to the first embodiment.

FIG. 5 is a flowchart illustrating the flow of image processing according to the first embodiment. In the following description of the flowchart, for example, a case in which image data acquired while flash light and environmental light are emitted to an object is used as the original image data will be described.

First, the light source type determination unit 40 determines the number of light sources of the original image data and the types of light source (S11 in FIG. 5). In this example, flash light and environmental light are determined as two light source types.

Then, the gain acquisition unit 42 acquires a "WB gain WB1 suitable for environmental light (hereinafter, referred to as a "reference WB gain WB1 for environmental light")" which is set in a case in which the light source type is environmental light and a "WB gain WB2 suitable for flash light (hereinafter, referred to as a "reference WB gain WB2 for flash light")" which is set in a case in which the light source type is flash light (S12).

Then, the mixture ratio acquisition unit 44 acquires the influence rate of each of the flash light and the environmental light for each pixel of the original image data and acquires a mixture ratio "Ratio_ij (where "i" indicates an X-axis value and "j" indicates a Y-axis value in a case in which a pixel position is represented by the X-axis value and the Y-axis value) of the reference WB gain for flash light and the reference WB gain for environmental light on the basis of the influence rate (S13).

Then, the storage control unit 33 stores the reference WB gain WB1 for environmental light, the reference WB gain WB2 for flash light, and the mixture ratio Ratio_ij in the main memory 10 so as to be associated with the original image data (S14).

As described above, according to this embodiment, the "reference WB gain for each light source type" and the "mixture ratio" which are the basis for calculating the WB gain used in multi-area WB processing are stored so as to be associated with the original image data. Therefore, it is possible to simply acquire the WB gain suitable for each pixel, using the stored "reference WB gain for each light source type" and "mixture ratio". As a result, it is possible to perform multi-area WB processing for the original image data subsequently in response to requests from the user. For example, RAW image data is stored as the original image data in the main memory 10 together with the "reference WB gain for each light source type" and the "mixture ratio". In this case, when performing a development process for the RAW image data, the user can determine whether to perform the multi-area WB processing.

In a case in which the multi-area WB processing is performed subsequently, it is possible to change the "reference WB gain for light source type" and/or the "mixture ratio" in response to requests from the user and thus to improve flexibility in white balance adjustment. Therefore, for example, the user can individually adjust the white balances of an "image portion such as a person image with a high influence rate of flash light" and an "image portion such as a background image with a low influence rate of flash light".

Second Embodiment

In this embodiment, the detailed description of the same or similar structure and operation as those in the first embodiment will not be repeated.

This embodiment relates to a detailed aspect of the first embodiment and relates a case in which flash emission image data obtained by capturing a scene while emitting flash light is used as the original image data.

Figure 6:
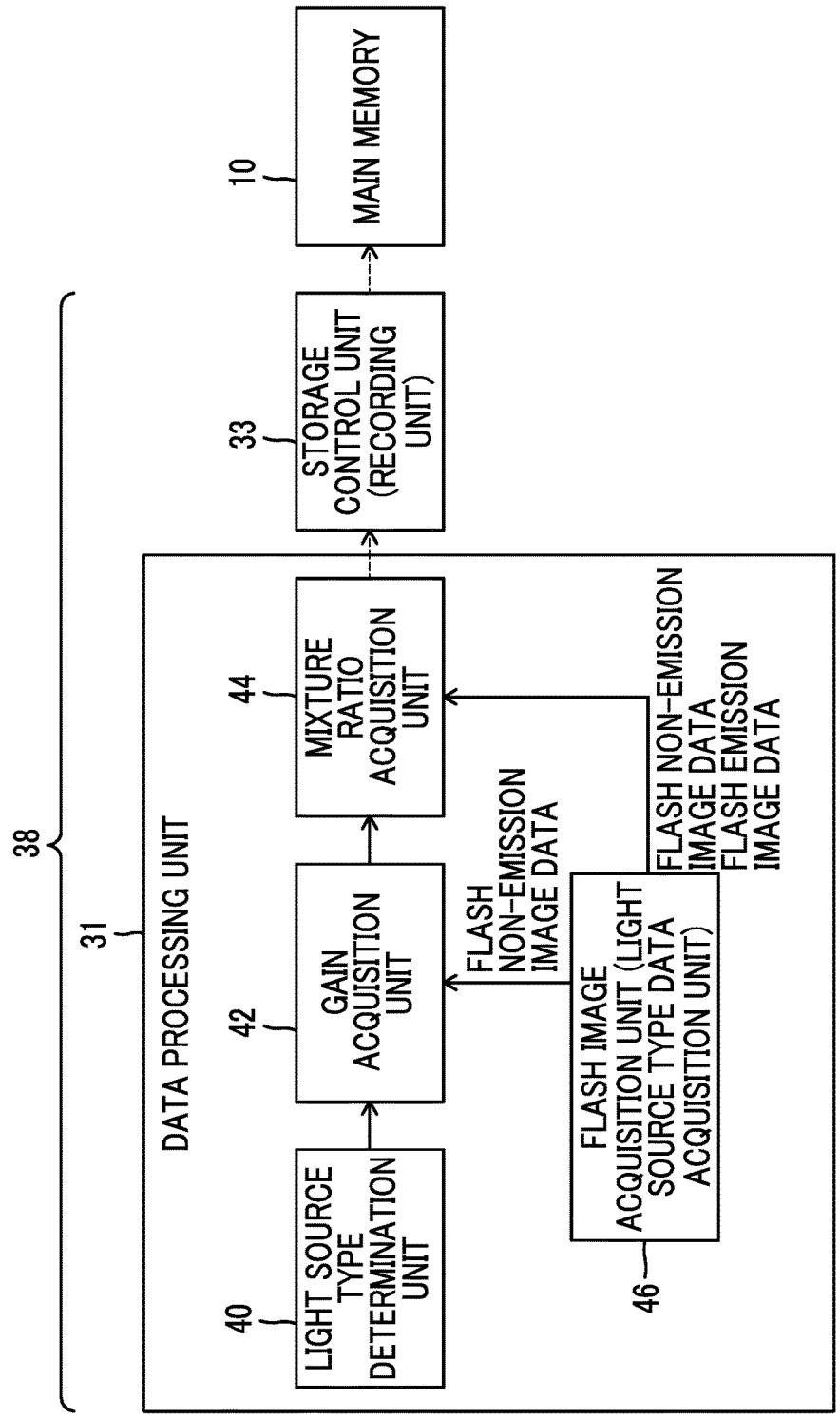
FIG. 6 is a block diagram illustrating an example of the functional structure of an image processing unit according to a second embodiment.

FIG. 6 is a block diagram illustrating an example of the functional structure of an image processing unit 38 according to a second embodiment.

A data processing unit 31 (image processing unit 38) according to this embodiment includes a flash image acquisition unit 46, in addition to the light source type determination unit 40, the gain acquisition unit 42, and the mixture ratio acquisition unit 44. The flash image acquisition unit 46 acquires flash emission image data which is captured while flash light is emitted and flash non-emission image data which is obtained by capturing an image of the same object as that in the flash emission image data, when flash light is not emitted. That is, in this embodiment, when the user presses the shutter button 6 (see FIGS. 1 and 2) in order to acquire the flash emission image data, the system control unit 25 controls, for example, the imaging element 21, while controlling the emission of light from the flash light emitting unit 5, such that an imaging process using flash light and an imaging process without using flash light are automatically and continuously performed. The flash image acquisition unit 46 acquires the flash emission image data and the flash non-emission image data captured by these imaging processes.

The original image data to be processed which is stored in the main memory 10 is flash emission image data. However, flash non-emission image data may be stored in the main memory 10 together with the flash emission image data.

The flash emission image data and the flash non-emission image data are transmitted from the flash image acquisition unit 46 to the mixture ratio acquisition unit 44 and the flash non-emission image data is also transmitted to the gain acquisition unit 42.

The flash non-emission image data is image data which is not affected by flash light and is captured under environmental light as a main light source. Therefore, the gain acquisition unit 42 analyzes the flash non-emission image data to acquire the reference WB gain for environmental light. Specifically, the gain acquisition unit 42 may calculate a WB gain for an auto white balance mode (hereinafter, referred to as an "AWB gain") and set the AWB gain as the reference WB gain for environmental light. The AWB gain can be calculated by any method. For example, the gain acquisition unit 42 may analyze the flash non-emission image data to obtain color distribution information from R, G, and B pixel values and set a gain at which the mean is an achromatic color as the AWB gain (WB gain for environmental light). In addition, the gain acquisition unit 42 may obtain brightness distribution information from the brightness value of the flash non-emission image data and determine the AWB gain (WB gain for environmental light) on the basis of the brightness distribution information. Furthermore, the WB gain which is set for each of a plurality of environmental light types may be stored in a memory, such as the control memory 30, in advance and the gain acquisition unit 42 may analyze the flash non-emission image data to determine the type of environmental light, acquire the WB gain related to the determined type of environmental light from the memory, and set the WB gain as the WB gain for environmental light.

In contrast, the reference WB gain for flash light is calculated in advance on the basis of the characteristics of flash light and is then stored in a memory such as the control memory 30. The gain acquisition unit 42 reads the reference WB gain for flash light from the memory and acquires the reference WB gain for flash light.

The mixture ratio acquisition unit 44 acquires the influence rate of each of the flash light and the environmental light from the flash emission image data and the flash non-emission image data acquired by the flash image acquisition unit 46 and acquires the mixture ratio of the reference white balance gain for flash light and the reference white balance gain for environmental light on the basis of the influence rate.

Specifically, in this example, the mixture ratio acquisition unit 44 acquires the brightness value (hereinafter, referred to as a "first brightness value") of each pixel of the flash non-emission image data, acquires the brightness value (hereinafter, referred to as a "second brightness value") of each pixel of the flash emission image data, and acquires the influence rate of each of the flash light and the environmental light on the basis of the first brightness value and the second brightness value.

A method for acquiring the first brightness value and the second brightness value is not particularly limited. For example, in each of the flash emission image data and the flash non-emission image data, in a case in which an R pixel value is represented by "$R\_ij$ (where "i" indicates an X-axis value and "j" indicates a Y-axis value in a case in which a pixel position is represented by the X-axis value and the Y-axis value)", a G pixel value is represented by "$G\_ij$ (where "i" indicates an X-axis value and "j" indicates a Y-axis value in a case in which a pixel position is represented by the X-axis value and the Y-axis value)", and a B pixel value is represented by "$B\_ij$ (where "i" indicates an X-axis value and "j" indicates a Y-axis value in a case in which a pixel position is represented by the X-axis value and the Y-axis value)", the brightness value (first brightness value) "$Y1\_ij$ (where "i" indicates an X-axis value and "j" indicates a Y-axis value in a case in which a pixel position is represented by the X-axis value and the Y-axis value)" of each pixel of the flash non-emission image data and the brightness value (second brightness value) "$Y2\_ij$ (where "i" indicates an X-axis value and "j" indicates a Y-axis value in a case in which a pixel position is represented by the X-axis value and the Y-axis value)" of each pixel of the flash emission image data can be represented by the following Expressions 1 and 2. In the following Expressions 1 and 2, "0.299", "0.587", and "0.114" are used as coefficients. However, other coefficients may be used.

$$Y1\_ij = R\_ij \times 0.299 + G\_ij \times 0.587 + B\_ij \times 0.114 \quad \text{[Expression 1]}$$

$$Y2\_ij = R\_ij \times 0.299 + G\_ij \times 0.587 + B\_ij \times 0.114 \quad \text{[Expression 2]}$$

The mixture ratio acquisition unit 44 can acquire a flash influence rate "$Flash\_ij$" and a mixture ratio "$Ratio\_ij$" on the basis of the first brightness value $Y1\_ij$ and the second brightness value $Y2\_ij$, using the following Expression 3.

$$Ratio\_ij = Flash\_ij = 1 - (Y1\_ij / Y2\_ij) \quad \text{[Expression 3]}$$

Similarly to the first embodiment, the storage control unit 33 stores the acquired reference WB gain for environmental light, reference WB gain for flash light, and mixture ratio in the main memory 10 so as to be associated with the original image data (flash emission image data). The mixture ratio $Ratio\_ij$ may be equivalent to the flash influence rate $Flash\_ij$ as in this example (see Expression 3), may be different from the flash influence rate $Flash\_ij$, or may be a value in which the flash influence rate $Flash\_ij$ is reflected.

Figure 7:
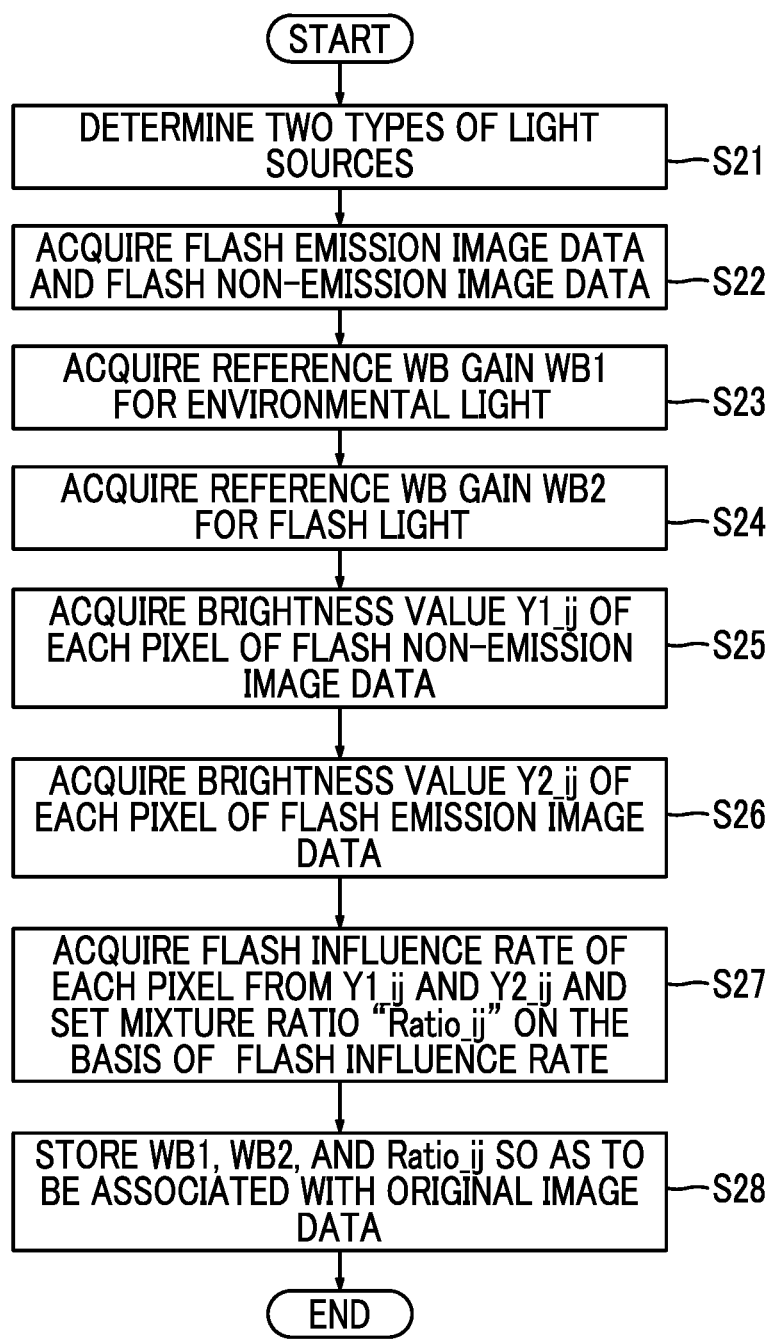
FIG. 7 is a flowchart illustrating the flow of image processing according to the second embodiment.

FIG. 7 is a flowchart illustrating the flow of image processing according to the second embodiment.

First, the light source type determination unit 40 determines that the number of light source types of the original image data is two (flash light and environmental light) in (S21 in FIG. 7) and the flash image acquisition unit 46 acquires flash emission image data and flash non-emission image data (S22).

Then, the gain acquisition unit 42 acquires the reference WB gain WB1 for environmental light from the flash non-emission image data (S23) and acquires the reference WB gain WB2 for flash light from the memory (S24).

Then, the mixture ratio acquisition unit 44 acquires the brightness value (first brightness value) $Y1\_ij$ of each pixel of the flash non-emission image data (S25) and acquires the brightness value (second brightness value) $Y2\_ij$ of each pixel of the flash emission image data (S26). Then, the mixture ratio acquisition unit 44 acquires the flash influence rate $Flash\_ij$ for each pixel of the original image data (flash emission image data) from the first brightness value $Y1\_ij$ and the second brightness value $Y2\_ij$ and sets the mixture ratio $Ratio\_ij$ on the basis of the flash influence rate (S27).

Then, the storage control unit 33 stores the reference WB gain WB1 for environmental light, the reference WB gain WB2 for flash light, and the mixture ratio $Ratio\_ij$ in the main memory 10 so as to be associated with the original image data (flash emission image data) (S28).

As described above, according to this embodiment, the "reference WB gain for environmental light", the "reference WB gain for flash light", and the "mixture ratio" which are the basis for calculating the WB gain set for each pixel of the original image data (flash emission image data) acquired by an imaging process with flash light are stored so as to be associated with the original image data. Therefore, in a case in which the white balance of an image is adjusted subsequently, it is possible to individually adjust the white balance of a "image portion dominantly affected by flash light" and an "image portion dominantly affected by environmental light", using the stored "reference WB gain for environmental light", "reference WB gain for flash light", and "mixture ratio".

For example, in a case in which the user "wants to slightly correct only a person image portion greatly affected by flash light to the red side, the reference WB gain WB2 for flash light suitable for flash light is slightly shifted to the red side. In this case, only the color (color balance) of the pixel having a high proportion of the reference WB gain WB2 for flash light is shifted to the red side and the color (color balance) of the pixel having a low proportion of the reference WB gain WB2 for flash light and a high proportion of the reference WB gain WB1 for environmental light is less likely to be affected. As a result, the color of a person image portion having a high proportion of the reference WB gain WB2 for flash light is corrected to the red side and the color of a background image portion having a high proportion of the reference WB gain WB1 for environmental light is maintained. Therefore, it is possible to perform white balance adjustment that meets the demand of the user.

In the second embodiment illustrated in FIGS. 6 and 7, an example in which flash light and environmental light are treated as the first light source type and the second light source type of the original image data, respectively, has been described. However, the first light source type and the second light source type are not particularly limited. The light source type data acquisition unit (see FIG. 6) may acquire first image data indicating the influence of the first light source type and second image data indicating the influence of the second light source type, instead of the flash emission image data and the flash non-emission image data. That is, in a case in which the light source types of the original image data determined by the light source type determination unit include the first light source type and the second light source type, the gain acquisition unit 42 may acquire a reference white balance gain that is set for the first light source type and is suitable for the first light source type and a reference white balance gain that is set for the second light source type and is suitable for the second light source type. In this case, the mixture ratio acquisition unit 44 acquires the influence rate of the first light source type and the second light source type of the original image data from the first image data and the second image data and acquires the mixture ratio of the reference white balance gain set for the first light source type and the reference white balance gain set for the second light source type, on the basis of the influence rate. Then, the storage control unit 33 can store the reference white balance gain set for the first light source type, the reference white balance gain set for the second light source type, and the mixture ratio in a storage medium so as to be associated with the original image data.

Third Embodiment

In this embodiment, the detailed description of the same or similar structure and operation as those in the first and second embodiments will not be repeated.

In this embodiment, the process of acquiring the reference WB gain and the mixture ratio and the storage process in the first embodiment are performed only in a case in which a white balance setting mode (hereinafter, referred to as a "WB setting mode") when the original image data is acquired is an AWB mode. In a case in which the WB setting mode is the modes other than the AWB mode, such as a preset white balance mode (hereinafter, referred to as a "preset WB mode"), a custom white balance mode (hereinafter, referred to as a "custom WB mode"), and a manual white balance mode (hereinafter, referred to as a "manual WB mode"), the process of acquiring the reference WB gain and the mixture ratio and the storage process in the first embodiment are not performed.

The WB setting mode which can be selected when the original image data is acquired is not particularly limited. For example, only a predetermined type of WB mode may be selected as the WB setting mode or a mode designated by the user or a mode corresponding to imaging conditions among a plurality of types of WB modes may be selected as the WB setting mode.

Therefore, for example, any one of the preset WB mode in which the WB gain is preset according to a predetermined light source type (for example, daylight (sunlight), a fluorescent light, or a light bulb), the AWB mode in which the WB gain applied to the original image data is determined on the basis of the color distribution information of the original image data, and the custom WB mode in which the WB gain applied to the original image data is determined on the basis of the color distribution information of reference image data different from the original image data may be selected as the WB setting mode. In addition, the manual WB mode in which the user manually determines an individual WB gain may be selected as the WB setting mode.

Next, an example in which the same process as that in the first embodiment is performed in a case in which the WB setting mode is the AWB mode will be described. However, the invention is not limited thereto. For example, instead of the same process as that in the first embodiment, the same process as that in the second embodiment will be described.

FIG. 8 is a block diagram illustrating an example of the functional structure of an image processing unit 38 according to the third embodiment.

A data processing unit 31 (image processing unit 38) according to this embodiment includes a setting mode determination unit 48, in addition to the light source type determination unit 40, the gain acquisition unit 42, and the mixture ratio acquisition unit 44. The setting mode determination unit 48 determines the WB setting mode when the original image data is acquired. A method for determining the WB setting mode is not particularly limited. In a case in which the system control unit 25 has information about the WB setting mode, the setting mode determination unit 48 may acquire the information about the WB setting mode from the system control unit 25.

In the example illustrated in FIG. 8, the setting mode determination unit 48 and the system control unit 25 are separately illustrated. However, the system control unit 25 may function as the setting mode determination unit 48. In this case, the system control unit 25 is included in the image processing unit 38.

The setting mode determination unit 48, the light source type determination unit 40, the gain acquisition unit 42, and the mixture ratio acquisition unit 44 included in the data processing unit 31 are controlled by the system control unit 25 and the system control unit 25 can determine whether to perform the processes of each unit. In particular, in this embodiment, only in a case in which the WB setting mode determined by the setting mode determination unit 48 is the AWB mode, the image processing unit 38 performs the same process as that in the first embodiment.

That is, only in a case in which the WB setting mode is the AWB mode, the light source type determination unit 40 determines the number of light sources of the original image data and the types of light source and the gain acquisition unit 42 acquires the reference white balance gain set for each light source type. In addition, the mixture ratio acquisition unit 44 acquires the influence rate of each light source type for each pixel of the original image data and acquires the mixture ratio of the reference white balance gains on the basis of the influence rate. Then, the storage control unit 33 stores the reference white balance gain and the mixture ratio in the main memory 10 so as to be associated with the original image data.

FIG. 9 is a flowchart illustrating the flow of image processing according to the third embodiment. In the following description, an example in which flash emission image data having flash light and environmental light as the light source type is used as the original image data will be described.

First, the setting mode determination unit 48 determines the WB setting mode when the original image data is acquired (S31 in FIG. 9) and the system control unit 25 determines whether the WB setting mode is the AWB mode (S32).

In a case in which the WB setting mode is determined to be the AWB mode (Y in S32), the light source type determination unit 40 determines the number of light sources of the original image data and the types of light source (for example, flash light and environmental light) (S33). Then, the gain acquisition unit 42 acquires the reference white balance gain (the reference WB gain for environmental light and the reference WB gain for flash light) set for each light source type (S34).

Then, the mixture ratio acquisition unit 44 acquires the influence rate of each light source type for each pixel of the original image data and acquires the mixture ratio of the reference white balance gains (the reference WB gain for environmental light and the reference WB gain for flash light) on the basis of the influence rate (S35). Then, the storage control unit 33 stores the reference white balance gains (the reference WB gain for environmental light and the reference WB gain for flash light) and the mixture ratio in the main memory 10 so as to be associated with the original image data (S36).

On the other hand, in a case in which the WB setting mode is determined not to be the AWB mode (N in S32), Steps S33 to S36 are skipped.

As described above, according to this embodiment, the reference white balance gain and the mixture ratio are stored in the main memory 10 so as to be associated with the original image data acquired in the AWB mode. Therefore, similarly to the first embodiment, the user can adjust the white balance of an image subsequently with high flexibility. For the original image data acquired in the modes other than the AWB mode, Steps S33 to S36 are skipped. Therefore, it is possible to perform the process from the capture of the original image data to the storage of the original image data in the main memory 10 at a high speed.

Fourth Embodiment

In this embodiment, the detailed description of the same or similar structure and operation as those in the first to third embodiments will not be repeated.

In the third embodiment, even in a case in which the WB setting mode is the AWB mode, the same process as that in the first embodiment or the second embodiment is performed. However, in this embodiment, the same process as that in the first embodiment or the second embodiment is performed regardless of the WB setting mode when the original image data is acquired.

As described above, a special process or information is required to perform multi-area WB processing. In a case in which the user wants to perform the multi-area WB processing when the original image data is captured and acquired, it is possible to perform a special process for the multi-area WB processing or to acquire special information when the original image data is acquired. However, in a case in which the user wants to perform the multi-area WB processing in a stage in which, for example, RAW image data is developed after imaging, a special process for the multi-area WB processing which is required during imaging is not performed and information which needs to be acquired during imaging is not acquired. Therefore, it is difficult to achieve the multi-area WB processing.

For example, in a case in which the multi-area WB processing is performed for image data, which has been captured while flash light is emitted in a night portrait scene, as the original image data, it is necessary to also acquire flash non-emission image data, to acquire the influence rate of flash for each pixel from the difference between the pixel values of the flash emission image data and the flash non-emission image data, and to acquire the mixture ratio of the reference WB gain for environmental light and the reference WB gain for flash light for each pixel according to the influence rate of flash. However, even if these processes are performed in the stage in which RAW image data (original image data) is developed, it is difficult to acquire the "WB gain suitable for each pixel" for performing multi-area WB processing since only the flash emission image data is stored as the RAW image data and the flash non-emission image data required for multi-area WB processing is absent.

Therefore, according to this modification example in which the reference white balance gain and the mixture ratio are stored in the main memory 10 as in the first embodiment or the second embodiment, regardless of the WB setting mode when the original image data is acquired, even if the user wants to perform multi-area WB processing subsequently, it is possible to acquire white-balance-adjusted image data (hereinafter, referred to as "WB-adjusted image data") subjected to appropriate multi-area WB processing.

The image processing unit 38 according to this embodiment has the same basic structure as that according to the first embodiment (see FIG. 4) or the second embodiment (see FIG. 6). That is, the light source type determination unit 40 determines the number of light sources of the original image data and the types of light source, regardless of the WB setting mode when the original image data is acquired. The gain acquisition unit 42 acquires the reference white balance gain set for each light source type. The mixture ratio acquisition unit 44 acquires the influence rate of each light source type for each pixel of the original image data and acquires the mixture ratio of the reference white balance gains on the basis of the influence rate. The storage control unit 33 stores the reference white balance gains and the mixture ratio in the main memory 10 so as to be associated with the original image data.

FIG. 10 is a flowchart illustrating the flow of image processing according to the fourth embodiment. In this embodiment, Steps S31 and S32 (see FIG. 9) related to the determination of the WB setting mode are omitted and Steps S33 to S36 are performed in the processing flow of the third embodiment.

That is, the light source type determination unit 40 determines the number of light sources of the original image data and the types of light source (for example, flash light and environmental light), regardless of the WB setting mode when the original image data is acquired (S33). Then, the gain acquisition unit 42 acquires the reference white balance gains (for example, the reference WB gain for environmental light and the reference WB gain for flash light) set for each light source type (S34).

Then, the mixture ratio acquisition unit 44 acquires the influence rate of each light source type for each pixel of the original image data and acquires the mixture ratio of the reference white balance gains (for example, the reference WB gain for environmental light and the reference WB gain for flash light) on the basis of the influence rate (S35). Then, the storage control unit 33 stores the reference white balance gains (for example, the reference WB gain for environmental light and the reference WB gain for flash light) and the mixture ratio in the main memory 10 so as to be associated with the original image data (S36).

As described above, according to this embodiment, an operation for multi-area WB processing is always performed, regardless of the WB setting mode when the original image data is acquired, and the reference white balance gains and the mixture ratio are stored in the main memory 10 so as to be associated with the original image data. Therefore, the user can determine whether or not to perform multi-area WB processing for the original image data subsequently, regardless of the WB setting mode when the original image data is acquired.

Fifth Embodiment

In this embodiment, the detailed description of the same or similar structure and operation as those in the first to fourth embodiments will not be repeated.

This embodiment relates to a process which reads the reference WB gain and the mixture ratio from the main memory 10, in addition to the original image data, and performs multi-area WB processing for the original image data to obtain WB-adjusted image data.

That is, a data processing unit 31 according to this embodiment acquires the reference WB gains and the mixture ratio which are stored so as to be associated with the original image data from the main memory 10 and performs WB processing for the original image data. Therefore, the reference WB gains and the mixture ratio are stored in the main memory 10 used in this embodiment so as to be associated with the original image data, for example, like the original image data according to the first to fourth embodiments.

The data processing unit 31 (see FIG. 12) according to this embodiment which will be described below may be provided integrally with or separately from the data processing unit 31 (see FIGS. 4, 6, and 8) including the "light source type determination unit 40, the gain acquisition unit 42, and the mixture ratio acquisition unit 44" described in the first to third embodiments. Therefore, for example, in a case in which the data processing unit 31 illustrated in FIGS. 4, 6, and 8 is provided in the digital camera 2, the data processing unit 31 according to this embodiment illustrated in FIG. 12 may be similarly provided in the digital camera 2 or may be provided in a computer 91 or a server 92 that is connected to the digital camera 2 through a wired or wireless network 94, as illustrated in FIG. 11. In addition, the data processing unit 31 illustrated in FIG. 12 may be provided in, for example, the computer 91 that can be connected to the main memory 10 separated from the digital camera 2. Furthermore, the data processing unit 31 illustrated in FIG. 12, which will be described below, may be provided in a portable terminal 96 such as a smart phone or a tablet terminal which is connected to the digital camera 2, the computer 91, or the server 92 and can receive the original image data.

Figure 12:
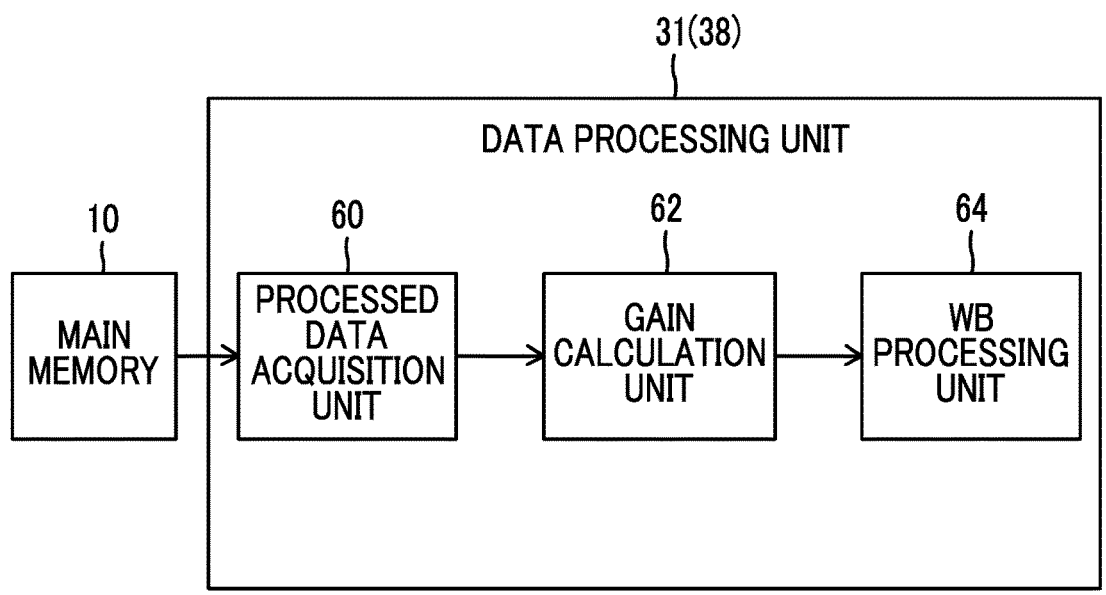
FIG. 12 is a block diagram illustrating an example of the functional structure of a data processing unit (image processing unit) according to a fifth embodiment.

FIG. 12 is a block diagram illustrating an example of the functional structure of the data processing unit 31 (image processing unit 38) according to the fifth embodiment.

The data processing unit 31 according to this embodiment includes a processed data acquisition unit 60, a gain calculation unit 62, and a WB processing unit 64.

The processed data acquisition unit 60 acquires the original image data, the reference WB gains which are set for each light source type of the original image data, and the mixture ratio of the reference WB gains set for each light source type of the original image data from the main memory 10. In a case in which the reference WB gains and the mixture ratio are included in the tag information of the original image data, the processed data acquisition unit 60 can acquire the reference WB gains and the mixture ratio from the tag information of the acquired original image data.

The gain calculation unit 62 calculates the application WB gain for each pixel of the original image data from the reference WB gains according to the mixture ratio.

The WB processing unit 64 applies the application WB gain to the original image data to acquire WB-adjusted image data. For example, in a case in which the pixel value of the original image data is represented by "V_ij (where "i" indicates an X-axis value and "j" indicates a Y-axis value in a case in which a pixel position is represented by the X-axis value and the Y-axis value)" and the application WB gain is represented by "WB_ij (where "i" indicates an X-axis value and "j" indicates a Y-axis value in a case in which a pixel position is represented by the X-axis value and the Y-axis value)", each pixel value "Q_ij (where "i" indicates an X-axis value and "j" indicates a Y-axis value in a case in which a pixel position is represented by the X-axis value and the Y-axis value)" of the WB-adjusted image data is represented by the following Expression 4.

$$Q\_ij = V\_ij \times WB\_ij \qquad \text{[Expression 4]}$$

Next, a case in which the reference WB gains acquired by the processed data acquisition unit 60 include a reference WB gain for flash light which is set in a case in which the light source type is flash light and a reference WB gain for environmental light which is set in a case in which the light source type is environmental light will be described. The mixture ratio acquired by the processed data acquisition unit 60 is a mixture ratio of the reference WB gain for flash light and the reference WB gain for environmental light which are set for each pixel of the original image data. The gain calculation unit 62 calculates an application white balance gain for each pixel of the original image data from the reference WB gain for flash light and the reference WB gain for environmental light according to the mixture ratio.

According to the data processing unit 31, in a case in which the original image data is RAW image data, when performing a development process for the RAW image data, the user can also perform multi-area WB processing, using the "reference WB gains (the reference WB gain for environmental light and the reference WB gain for flash light)" and the "mixture ratio" stored in the main memory 10.

Figure 13:
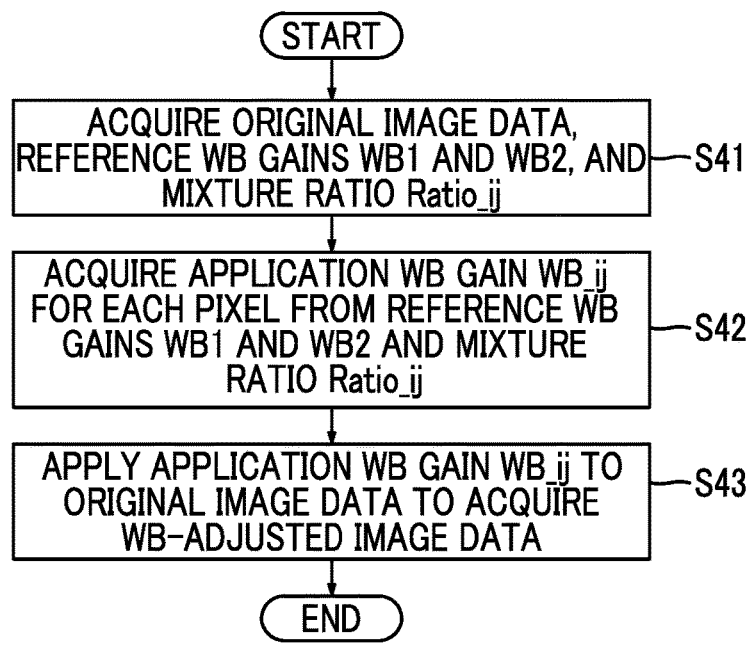
FIG. 13 is a flowchart illustrating the flow of image processing according to the fifth embodiment.

FIG. 13 is a flowchart illustrating the flow of image processing according to the fifth embodiment.

First, the processed data acquisition unit 60 acquires the original image data, the reference WB gain WB1 for environmental light, the reference WB gain WB2 for flash light, and the mixture ratio Ratio_ij from the main memory 10 (S41 in FIG. 13).

Then, the gain calculation unit 62 acquires the application WB gain WB_ij for each pixel of the original image data from the reference WB gain WB1 for environmental light, the reference WB gain WB2 for flash light, and the mixture ratio Ratio_ij (S42).

Then, the WB processing unit 64 applies the application WB gain WB_ij to the original image data to acquire WB-adjusted image data (S43).

As described above, according to this embodiment, it is possible to appropriately perform multi-area WB processing for the original image data.

Since the reference WB gains (the reference WB gain for environmental light and the reference WB gain for flash light) used in the multi-area WB processing are prepared for each light source type, the user can perform WB processing in which the influence of some of the light source types is individually changed. For example, in a case in which the user "wants to slightly correct only an image portion (for example, a person image) illuminated by flash to the red side, the WB processing unit 64 may slightly shift the reference WB gain for flash light used in the WB processing to the red side. In this case, only the color (color balance) of an image portion, such as a person image, having a high proportion of the reference WB gain for flash light in the WB-adjusted image data can be shifted to the red side and the correction has a small effect on a background image portion having a low proportion of the reference WB gain for flash light and a high proportion of the reference WB gain for environmental light. As such, according to the image processing unit 38 of this embodiment, flexibility in the adjustment of the white balance is high and it is possible to simply obtain WB-adjusted image data that meets the demand of the user.

Sixth Embodiment

In this embodiment, the detailed description of the same or similar structure and operation as those in the first to fifth embodiments will not be repeated.

Figure 14:
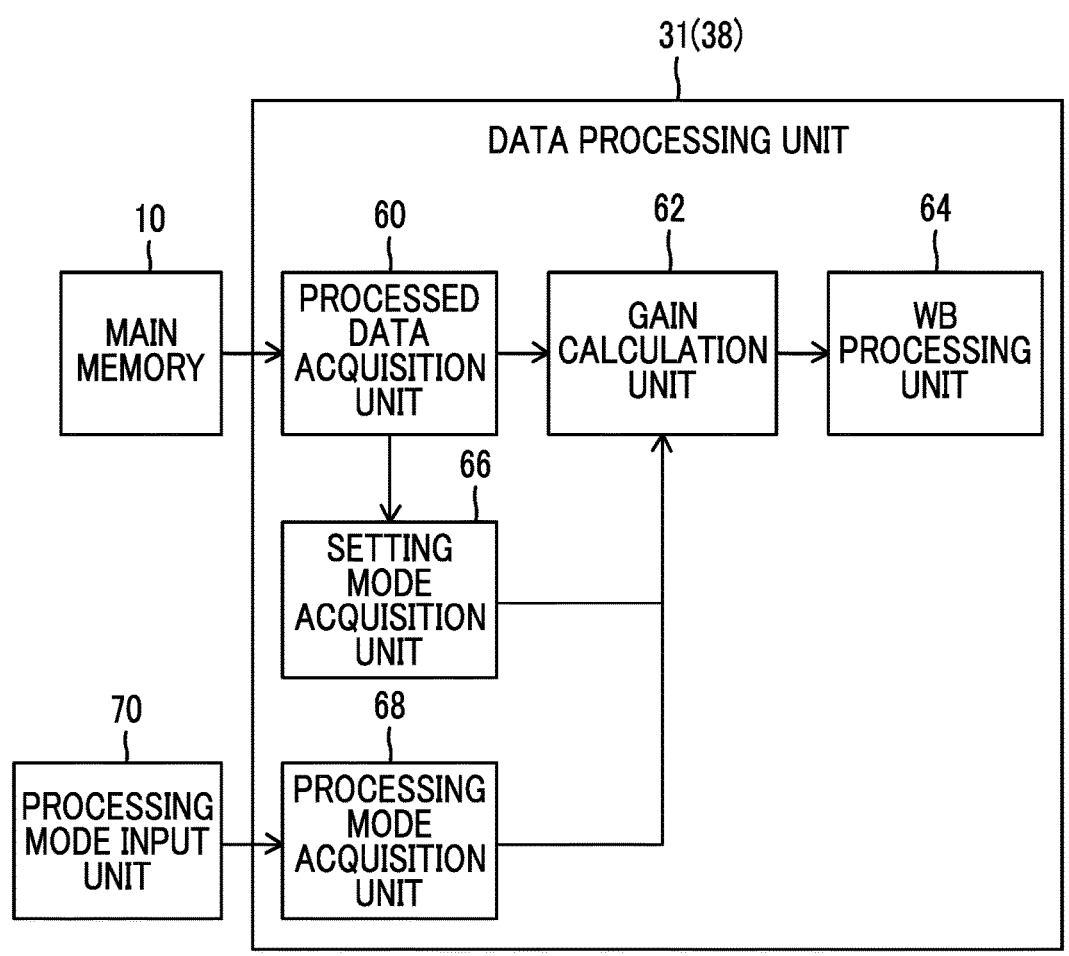
FIG. 14 is a block diagram illustrating an example of the functional structure of a data processing unit (image processing unit) according to a sixth embodiment.

FIG. 14 is a block diagram illustrating an example of the functional structure of a data processing unit 31 (image processing unit 38) according to a sixth embodiment.

The data processing unit 31 according to this embodiment includes a setting mode acquisition unit 66 and a processing mode acquisition unit 68, in addition to the processed data acquisition unit 60, the gain calculation unit 62, and the WB processing unit 64.

The setting mode acquisition unit 66 acquires information about the WB setting mode when the original image data is acquired. A method for acquiring the information about the WB setting mode is not particularly limited. For example, in a case in which the information about the WB setting mode is included in the tag information of the original image data, the setting mode acquisition unit 66 may read the information about the WB setting mode from the tag information of the original image data acquired by the processed data acquisition unit 60 and acquire the information about the WB setting mode.

The processing mode acquisition unit 68 acquires information about a white balance processing mode (hereinafter, referred to as a "WB processing mode") for the original image data. In this example, the "WB processing mode" is a WB mode that is desired by the user. The user inputs the WB mode that is desired as the actual WB processing for the original image data as the "WB processing mode" to a processing mode input unit 70.

The detailed form of the processing mode input unit 70 is not particularly limited. In a case in which the processing mode input unit 70 is provided in the digital camera 2, for example, the "operating unit 9 (see FIG. 2)" may form the processing mode input unit 70. In addition, in a case in which the processing mode input unit 70 is provided in the computer 91, the server 92, or the portable terminal 96, the processing mode input unit 70 can be formed by an arbitrary operating unit, such as a keyboard, a mouse, or a touch panel which is provided in or connected to these types of devices.

The "information about the WB processing mode for the original image data" acquired by the processing mode acquisition unit 68 is transmitted to the gain calculation unit 62. In addition, the "information about the WB setting mode for the original image data" acquired by the setting mode acquisition unit 66 is transmitted to the gain calculation unit 62.

In a case in which the WB processing mode is determined to be the same as the WB setting mode on the basis of the information about the WB setting mode and the information about the WB processing mode, the gain calculation unit 62 calculates the application WB gain on the basis of the reference WB gain which is acquired from the main memory 10 through the processed data acquisition unit 60. On the other hand, in a case in which the WB processing mode is determined to be different from the WB setting mode, the gain calculation unit 62 acquires the reference WB gain determined on the basis of the WB processing mode and calculates the application WB gain on the basis of the reference WB gain.

For example, in a case in which the WB setting mode is the AWB mode and the WB processing mode is the preset WB mode, the gain calculation unit 62 acquires the WB gain set for the preset WB mode and sets new reference WB gains (for example, the reference WB gain WB1 for environmental light and the reference WB gain WB2 for flash light) on the basis of the reference WB gain for the preset WB mode. A method for acquiring the reference WB gain determined on the basis of the WB processing mode is not particularly limited. In a case in which the "reference WB gain determined on the basis of the WB processing mode" is stored as the tag information of the original image data in the main memory 10, the gain calculation unit 62 may read the stored information and acquire the "reference WB gain determined on the basis of the WB processing mode".

In a case in which the WB processing mode is determined to be different from the WB setting mode, all of a plurality of reference WB gains which are used by the gain calculation unit 62 to calculate the application WB gain may be changed or only some of the plurality of reference WB gains may be changed. For example, the user may input information about a WB gain that is desired to be changed from the WB setting mode and a WB gain after a detailed change among the reference WB gains (for example, the reference WB gain WB1 for environmental light and the reference WB gain WB2 for flash light) to the processing mode input unit 70. In this case, the processing mode acquisition unit 68 acquires the information about "the reference WB gain that is desired to be changed from the WB setting mode" and "the WB gain after a detailed change" which are input to the processing mode input unit 70 by the user and transmits the information to the gain calculation unit 62. The gain calculation unit 62 changes "the reference WB gain that is desired to be changed from the WB setting mode" input by the user to the "WB gain after a detailed change" and acquires the application WB gain on the basis of the changed reference WB gain and the mixture ratio.

Figure 15:
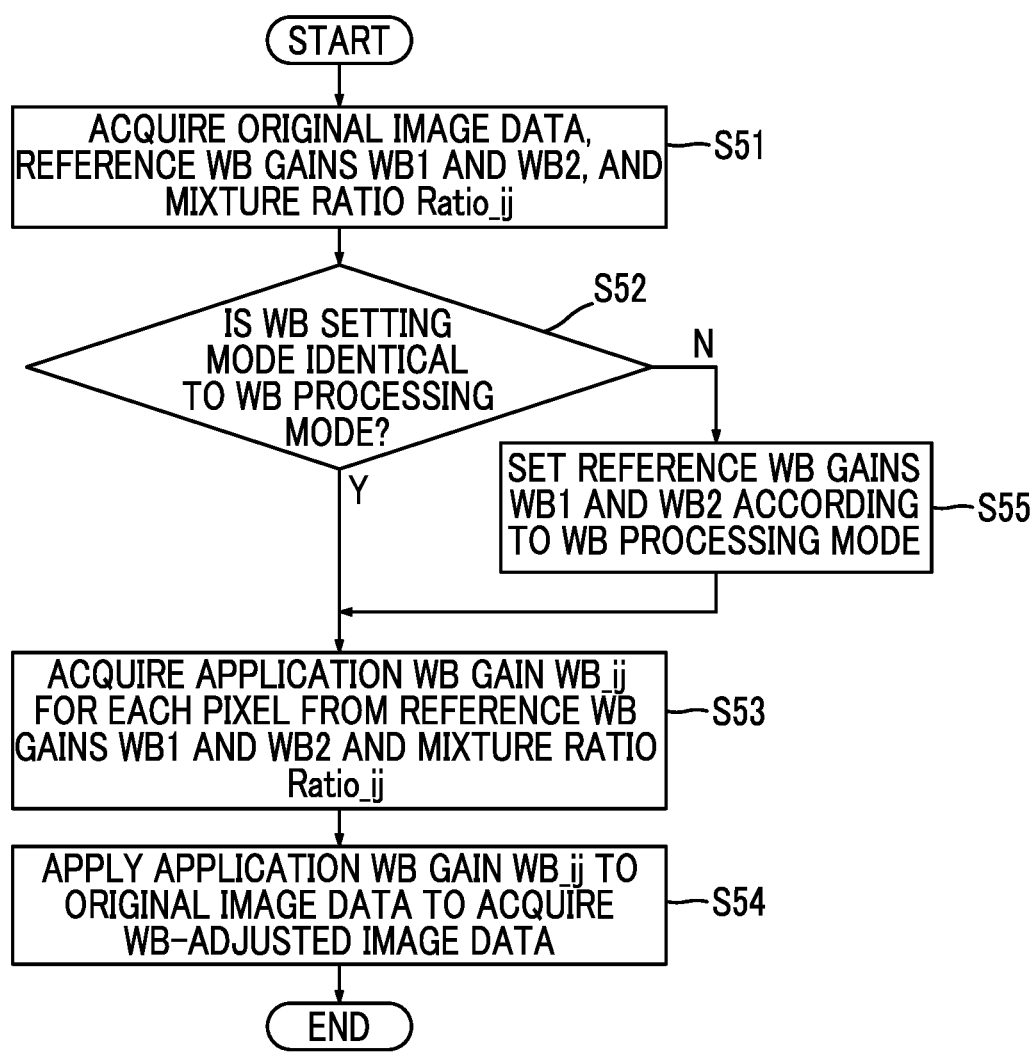
FIG. 15 is a flowchart illustrating the flow of image processing according to the sixth embodiment.

FIG. 15 is a flowchart illustrating the flow of image processing according to the sixth embodiment. In the following example, a case in which the reference WB gain WB1 for environmental light and the reference WB gain WB2 for flash light are stored as the reference WB gains in the main memory 10 will be described.

First, the processed data acquisition unit 60 acquires the original image data, the reference WB gain WB1 for environmental light, the reference WB gain WB2 for flash light, and the mixture ratio Ratio_ij from the main memory 10 (S51 in FIG. 15).

Then, the setting mode acquisition unit 66 acquires information about the WB setting mode when the original image data is acquired and the processing mode acquisition unit 68 acquires information about the WB processing mode which is input to the processing mode input unit 70 by the user. Then, the gain calculation unit 62 determines whether the WB setting mode is the same as the WB processing mode (S52).

In a case in which the WB setting mode is the same as the WB processing mode (Y in S52), the gain calculation unit 62 acquires the application WB gain WB_ij for each pixel of the original image data from the reference WB gains (the reference WB gain WB1 for environmental light and the reference WB gain WB2 for flash light) and the mixture ratio Ratio_ij which are acquired from the main memory 10 through the processed data acquisition unit 60 (S53).

On the other hand, in a case in which the WB setting mode is not the same as the WB processing mode (N in S52), the gain calculation unit 62 acquires the reference WB gain corresponding to the WB processing mode and sets the acquired reference WB gain as a new reference WB gain (the reference WB gain WB1 for environmental light and the reference WB gain WB2 for flash light) used in WB processing (S55). Then, the gain calculation unit 62 acquires the application WB gain WB_ij set for each pixel of the original image data from the newly set reference WB gain and the mixture ratio Ratio_ij (S53).

Then, the WB processing unit 64 applies the application WB gain WB_ij to the original image data to acquire WB-adjusted image data (S54).

As described above, according to this embodiment, it is possible to perform multi-area WB processing in which the user's preference during the adjustment of the white balance is reflected.

Seventh Embodiment

In this embodiment, the detailed description of the same or similar structure and operation as those in the first to sixth embodiments will not be repeated.

This embodiment relates to an example in which some or all of the reference WB gains are replaced with the WB gain corresponding to the light source type designated by the user and WB processing is performed for original image data.

Figure 16:
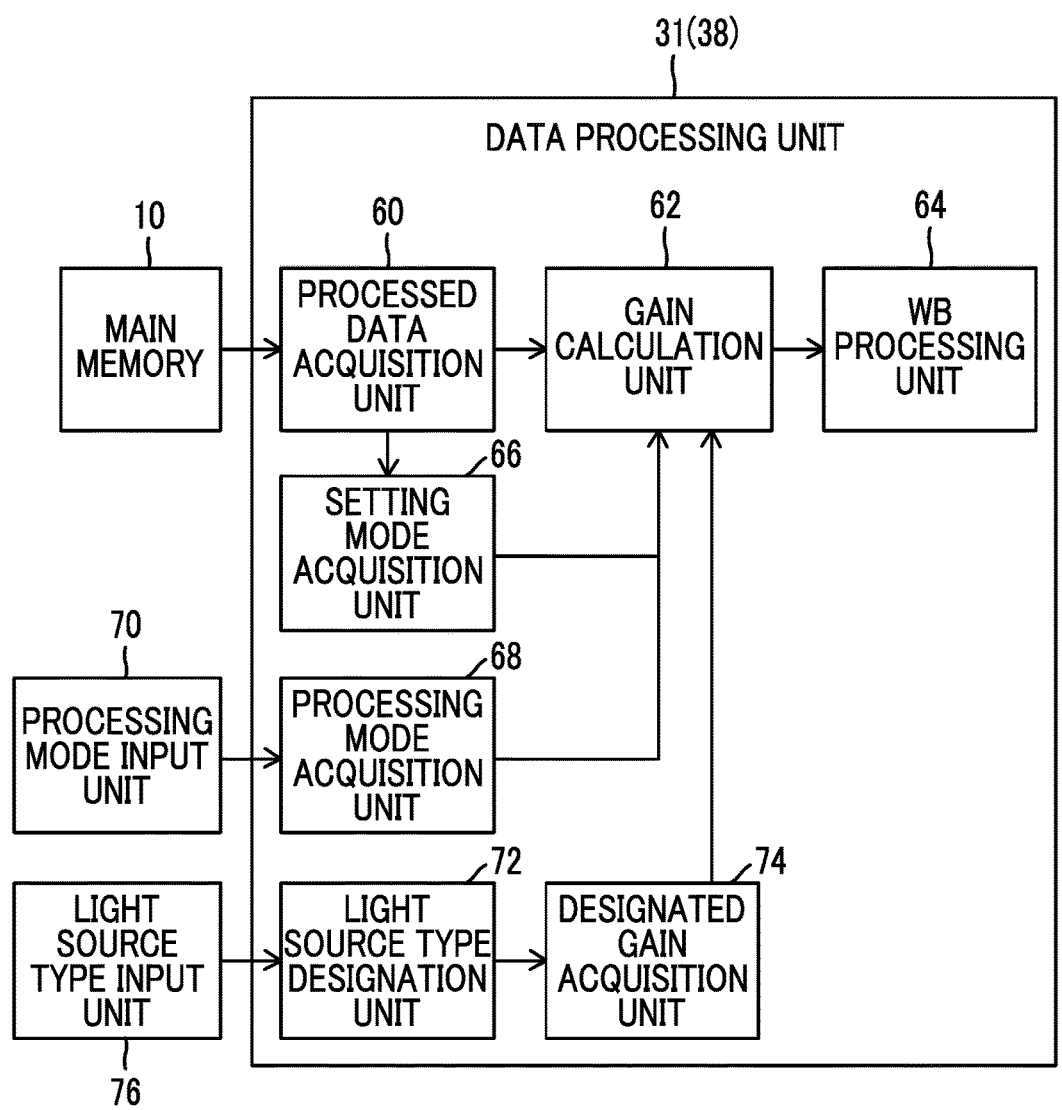
FIG. 16 is a block diagram illustrating an example of the functional structure of a data processing unit (image processing unit) according to a seventh embodiment.

FIG. 16 is a block diagram illustrating an example of the functional structure of a data processing unit 31 (image processing unit 38) according to a seventh embodiment.

The data processing unit 31 according to this embodiment includes a light source type designation unit 72 and a designated gain acquisition unit 74, in addition to the processed data acquisition unit 60, the gain calculation unit 62, the WB processing unit 64, the setting mode acquisition unit 66, and the processing mode acquisition unit 68.

The light source type designation unit 72 receives information about the light source type which is designated by the user through a light source type input unit 76. The detailed form of the light source type input unit 76 is not particularly limited. For example, similarly to the processing mode input unit 70, in a case in which the light source type input unit 76 is provided in the digital camera 2, the light source type input unit 76 can be formed by the "operating unit 9 (see FIG. 2)". In addition, in a case in which the light source type input unit 76 is provided in the computer 91, the server 92, or the portable terminal 96, the light source type input unit 76 can be formed by an arbitrary operating unit, such as a keyboard, a mouse, or a touch panel which is provided in or connected to these types of devices.

The designated gain acquisition unit 74 acquires the reference WB gain set for the "light source type designated by the user" which has been input to the light source type input unit 76 and then received by the light source type designation unit 72.

The gain calculation unit 62 replaces at least some of the reference WB gains set for each light source type of the original image data with the reference WB gains acquired by the designated gain acquisition unit 74 and calculates the application WB gain according to the mixture ratio.

Therefore, the user can replace some or all of the reference WB gains (for example, the reference WB gain WB1 for environmental light and the reference WB gain WB2 for flash light) with the reference WB gains set for other types of light sources and can perform WB processing for the original image data.

The processing mode input unit 70 and the light source type input unit 76 may be integrally provided and the processing mode acquisition unit 68 and the light source type designation unit 72 may be integrally provided. In this case, for example, in a case i which the user inputs a light source type for determining a new reference WB gain to the light source type input unit 76 in order to replace the reference WB gain, the gain calculation unit 62 may determine that the WB setting mode is different from the WB processing mode.

Figure 17:
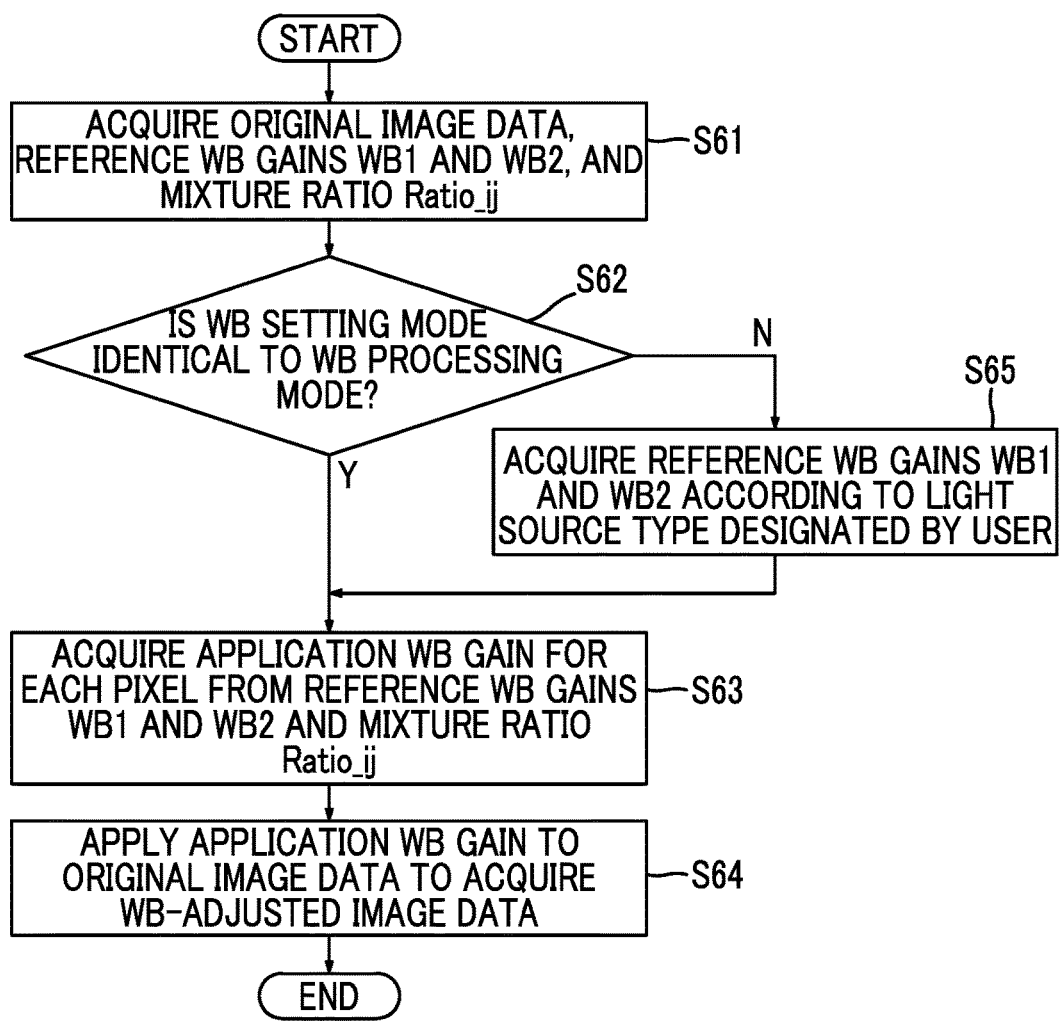
FIG. 17 is a flowchart illustrating the flow of image processing according to the seventh embodiment.

FIG. 17 is a flowchart illustrating the flow of image processing according to the seventh embodiment. In the following description of the flowchart, for example, a case in which the reference WB gains of the original image data are the reference WB gain WB1 for environmental light and the reference WB gain WB2 for flash light will be described.

First, the processed data acquisition unit 60 acquires the original image data, the reference WB gain WB1 for environmental light, the reference WB gain WB2 for flash light, and the mixture ratio Ratio_ij from the main memory 10 (S61 in FIG. 17).

Then, the setting mode acquisition unit 66 acquires information about the WB setting mode when the original image data is acquired and the processing mode acquisition unit 68 acquires information about the WB processing mode input by the user. Then, the gain calculation unit 62 determines whether the WB setting mode is the same as the WB processing mode (S62).

In a case in which the WB setting mode is the same as the WB processing mode (Y in S62), the gain calculation unit 62 acquires the application WB gain WB_ij for each pixel of the original image data from the reference WB gains (the reference WB gain WB1 for environmental light and the reference WB gain WB2 for flash light) and the mixture ratio Ratio_ij which are acquired from the main memory 10 through the processed data acquisition unit 60 (S63).

On the other hand, in a case in which the WB setting mode is not the same as the WB processing mode (N in S62), the user inputs information about light source types for determining the reference WB gains WB1 and WB2 to be newly set to the light source type input unit 76. The light source type designation unit 72 acquires data of the light source types input to the light source type input unit 76 and the designated gain acquisition unit 74 acquires new reference WB gains WB1 and WB2 determined according to the input light source types (S65). Then, the gain calculation unit 62 acquires the application WB gain WB_ij set for each pixel of the original image data from the new reference WB gains WB1 and WB2 and the mixture ratio Ratio_ij (S63).

Then, the WB processing unit 64 applies the application WB gain WB_ij to the original image data to acquire WB-adjusted image data (S64).

As described above, according to this embodiment, it is possible to perform multi-area WB processing in which the user's preference for the light source type during the adjustment of the white balance is reflected.

In the above-described embodiment, an example in which, after it is determined whether the WB processing mode is different from the WB setting mode, the user changes the light source type of the reference WB gain has been described. However, the user may change the light source type of the reference WB gain, if necessary, without determining whether the WB processing mode is different from the WB setting mode. In this case, for example, in the example illustrated in FIG. 16, the processing mode input unit 70 and the processing mode acquisition unit 68 are unnecessary.

Eighth Embodiment

In this embodiment, the detailed description of the same or similar structure and operation as those in the first to seventh embodiments will not be repeated.

This embodiment relates to an aspect of the display of adjusted image data on the display unit 8 and white balance adjustment. Next, for example, a case in which an image based on the WB-adjusted image data generated in the image processing unit 38 (data processing unit 31) according to the fifth embodiment (see FIG. 12) is displayed on the display unit 8 will be described.

Figure 18:
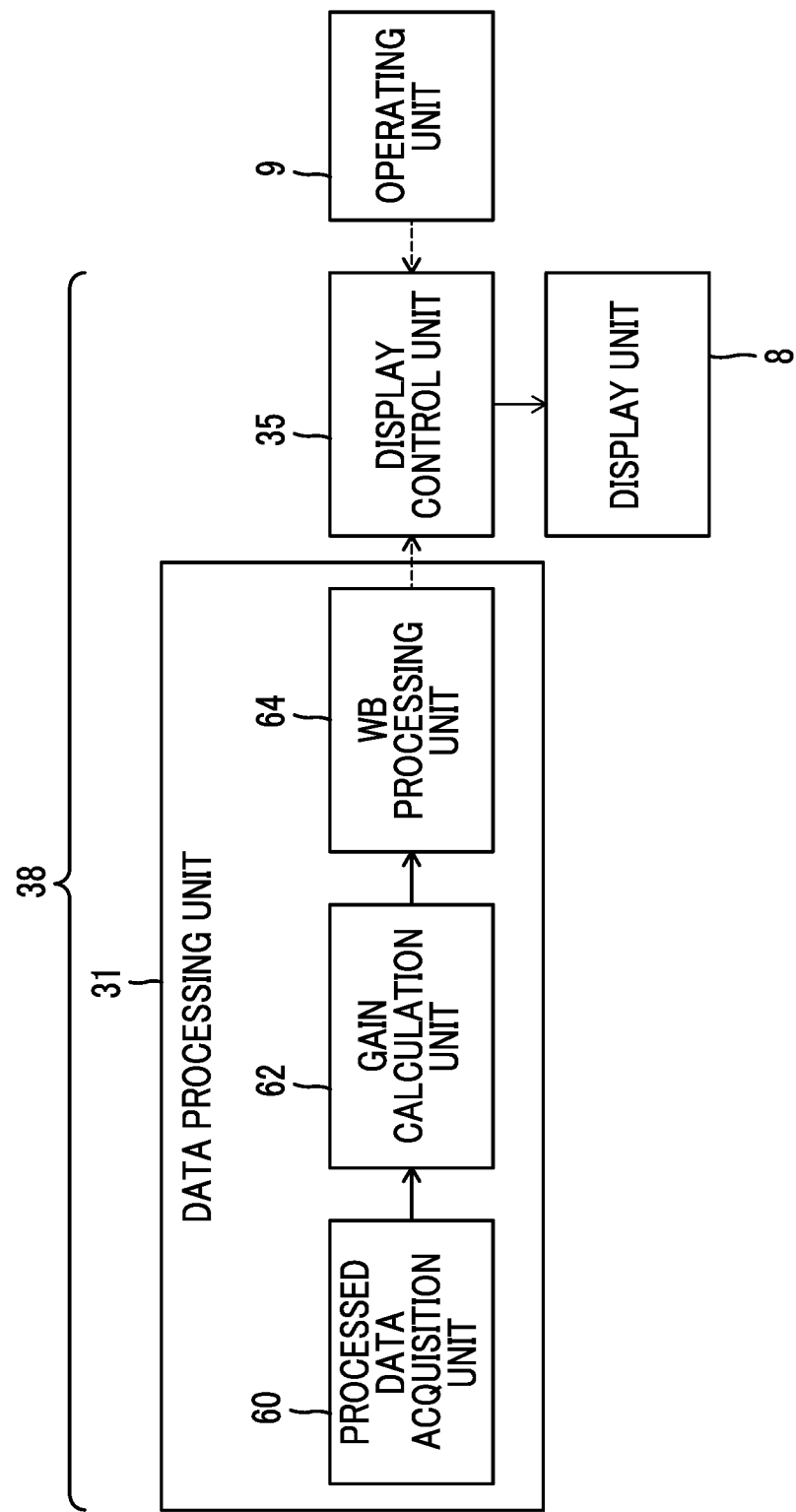
FIG. 18 is a block diagram illustrating an example of the functional structure of an image processing unit according to an eighth embodiment.

FIG. 18 is a block diagram illustrating an example of the functional structure of an image processing unit 38 according to an eighth embodiment.

The image processing unit 38 according to this embodiment includes a display control unit 35 and the display unit 8 which is controlled by the display control unit 35, in addition to the data processing unit 31. The display control unit 35 is connected to the operating unit 9 through the system control unit 25 (see FIG. 2) and displays the image based on the WB-adjusted image data on the display unit 8.

Figure 19:
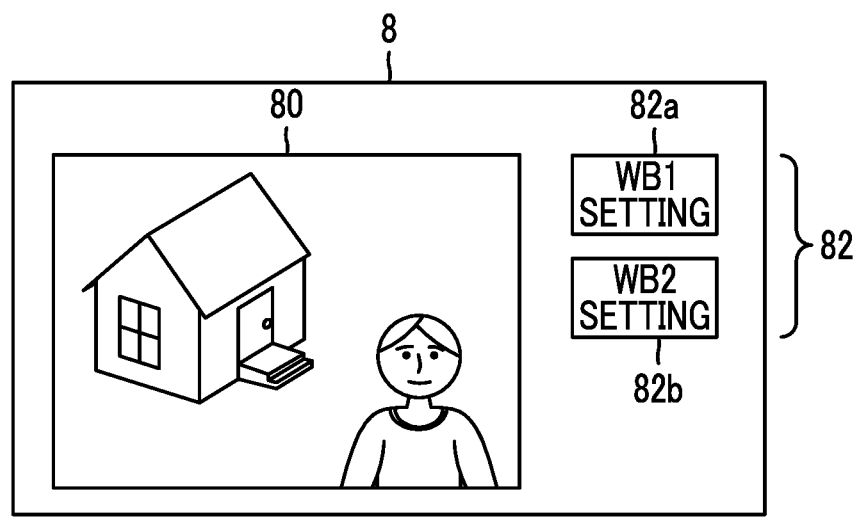
FIG. 19 is a diagram illustrating an example of the display of an image on a display unit.

FIG. 19 is a diagram illustrating an example of the display of an image on the display unit 8.

In the example illustrated in FIG. 19, the display control unit 35 controls the display unit 8 such that the image based on adjusted image data is displayed in an image display portion 80 of the display unit 8. In addition, the display control unit 35 displays a light source display portion 82 indicating the light source type of the original image data on the display unit 8. In a case in which there are a plurality of light source types in the original image data, the display control unit 35 displays a plurality of light source display portions 82 provided for each light source type on the display unit 8. Therefore, for example, in a case in which environmental light and flash light are assumed as the light sources of the original image data, a light source display portion 82a ("WB1 setting" in the example illustrated in FIG. 19) related to the environmental light and a light source display portion 82b ("WB2 setting" in the example illustrated in FIG. 19) related to the flash light are displayed on the display unit 8.

In the example illustrated in FIG. 19, adjusted image data is generated using flash emission image data as the original image data, and an image based on the adjusted image data includes a person image and the background including a building. Therefore, in the image based on the adjusted image data, a person image portion is greatly affected by flash light and a back ground portion is greatly affected by environmental light.

In this embodiment, the user designates any one of the light sources of the original image data and an image portion (pixel) that is greatly affected by the designated light source is displayed in the image display portion 80 so as to be highlighted.

Figure 20:
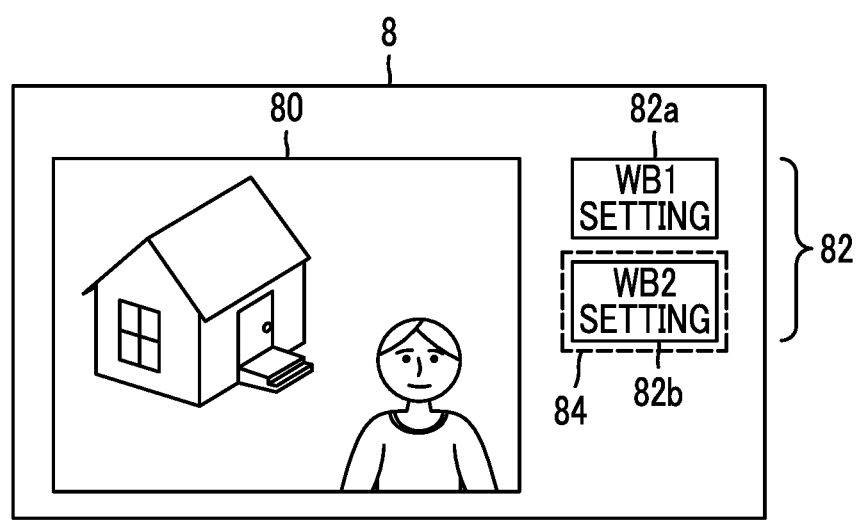
FIG. 20 is a diagram illustrating an example of the display of an image on the display unit in a mode in which a user designates highlighting.
Figure 21:
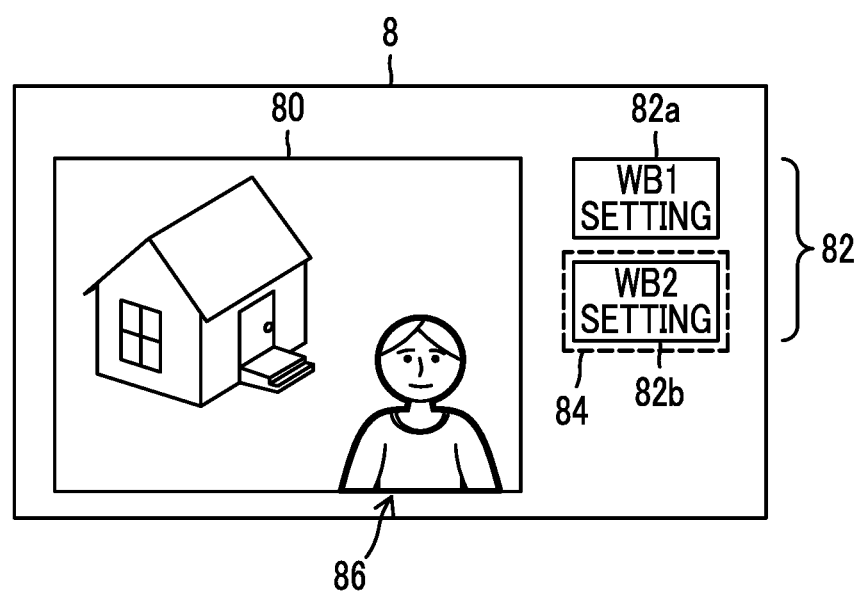
FIG. 21 is a diagram illustrating an example of the display of an image on the display unit when the user designates highlighting.

FIG. 20 is a diagram illustrating an example of the display of an image on the display unit 8 in the mode in which the user designates highlighting. FIG. 21 is a diagram illustrating an example of the display of an image on the display unit 8 in a case in which the user designates highlighting.

In a case in which a plurality of light source display portions 82 are displayed on the display unit 8, the display control unit 35 displays the plurality of light source display portions 82 such that any one of the plurality of light source display portions 82 can be designated by a highlighting designation portion 84 in response to an operation of the user through the operating unit 9. In addition, the display control unit 35 sets a portion of or the entire image displayed in the image display portion 80 of the display unit 8 as a highlighted portion 86 according to the influence rate of the light source corresponding to the light source display portion 82 designated by the highlighting designation portion 84 through the operating unit 9. Since the influence rate of the light source can be determined on the basis of the mixture ratio, the display control unit 35 acquires the influence rate of the light source for each pixel of the image displayed in the image display portion 80, on the basis of the mixture ratio acquired from the main memory 10 through the processed data acquisition unit 60.

Specifically, the display control unit 35 may display a pixel, which is more affected by a light source corresponding to the light source display portion 82 that is designated by the highlighting designation portion 84 in response to an operation of the user through the operating unit 9 than by other types of light sources among the light sources of the original image data, among the pixels of the image based on the adjusted image data displayed in the image display portion 80 as the highlighted portion 86 in the image display portion 80 of the display unit 8. For example, in a case in which the light source types of the original image data are environmental light (corresponding to the "light source display portion 82a" illustrated in FIG. 21) and flash light (corresponding to the "light source display portion 82b"), when the user operates the operating unit 9 to designate the light source display portion 82b corresponding to the flash light with the highlighting designation portion 84 as illustrated in FIG. 20, the pixels of a person image portion which is more affected by flash light than by environmental light are to be displayed as the highlighted portion 86 in the image display portion 80 as illustrated in FIG. 21.

A criterion for determining the highlighted portion 86 is not particularly limited. The display control unit 35 may determine the pixels which will be the highlighted portion 86 according to the absolute value of the influence rate of the light source designated by the user, instead of comparing the influence rates of the light sources of the original image data. That is, the display control unit 35 may display a pixel, on which the influence rate of the light source corresponding to the light source display portion 82 designated by the user through the operating unit 9 is higher than a first rate, in the image based on the adjusted image data displayed in the image display portion 80 on the display unit 8 so as to be highlighted. The "first rate" can be set to any value. For example, the first rate can be set to a percentage of 50%.

A method of displaying the highlighted portion 86 is not particularly limited. For example, the highlighted portion 86 may be displayed in such a way that an area formed by the pixels to be highlighted is surrounded by a thick frame.

As described above, according to this embodiment, when the user designates the light source display portion 82, an image portion (pixel) on which the influence rate of a specific light source is high is displayed as the highlighted portion 86 in the image display portion 80. Therefore, the user can easily check a portion on which the influence rate of a specific light source type is high in the image displayed in the image display portion 80.

Ninth Embodiment

In this embodiment, the detailed description of the same or similar structure and operation as those in the eighth embodiments will not be repeated.

In this embodiment, the light source type designated by the user can be changed or the influence rate can be changed. Next, an example in which the light source type designated by the user can be changed will be described.

Figure 22:
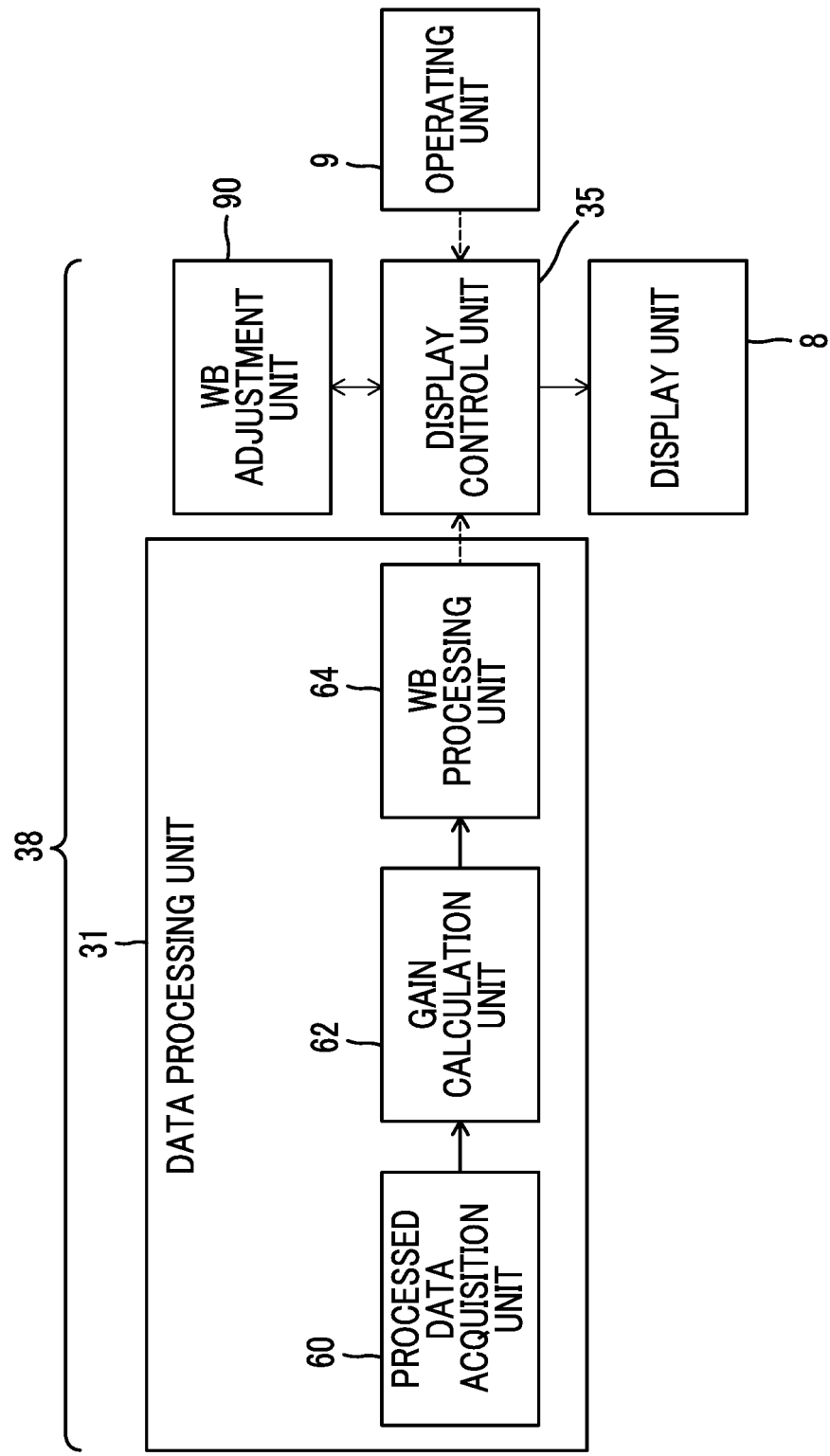
FIG. 22 is a block diagram illustrating an example of the functional structure of an image processing unit according to a ninth embodiment.

FIG. 22 is a block diagram illustrating an example of the functional structure of an image processing unit 38 according to a ninth embodiment.

The image processing unit 38 according to this embodiment includes a white balance adjustment unit (hereinafter, referred to as a "WB adjustment unit") 90 that adjusts the white balance of an image, in addition to the data processing unit 31, the display control unit 35, and the display unit 8.

The other structures of the image processing unit 38 are the same as those of the image processing unit 38 (see FIG. 18) according to the eighth embodiment.

That is, the display control unit 35 is connected to the operating unit 9 operated by the user through the system control unit 25 (see FIG. 3). As illustrated in FIG. 19, the display control unit 35 displays the image based on adjusted image data in the image display portion 80 of the display unit 8 and displays the light source display portion 82 indicating the light source type of the original image data on the display unit 8. In a case in which there are a plurality of light source types in the original image data, the display control unit 35 displays a plurality of light source display portions 82 provided for each light source type on the display unit 8.

Figure 23:
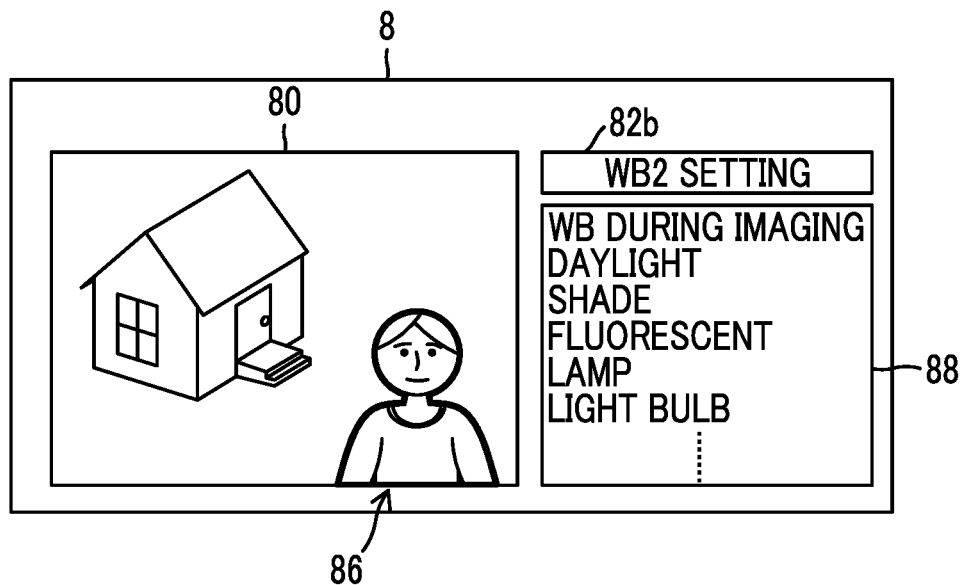
FIG. 23 is a diagram illustrating an example of the display of an image on a display unit according to the ninth embodiment.

Then, in a case in which a plurality of light source display portions 82 are displayed on the display unit 8, the display control unit 35 displays the plurality of light source display portions 82 such that any one of the plurality of light source display portions 82 can be designated by the highlighting designation portion 84 (see FIG. 20) in response to an operation of the user through the operating unit 9. When any one of the plurality of light source display portions 82 is designated by the highlighting designation portion 84, the display control unit 35 displays a change display portion 88 on the display unit 8 as illustrated in FIG. 23. The change display portion 88 receives a change in the white balance based on the light source corresponding to the light source display portion 82 which is designated by the highlighting designation portion 84 through the operating unit 9.

The display control unit 35 receives a change in the white balance of an image through the change display portion 88 in response to an operation of the user through the operating unit 9. In the example illustrated in FIG. 23, the user can designate a light source that is used, instead of the light source (flash light) corresponding to the light source display portion 82b in which "WB2 setting" is displayed from other light sources (for example, "daylight", "shade", a "fluorescent light", and a "light bulb") displayed in the change display portion 88 through the operating unit 9.

When the display control unit 35 receives a change in the white balance, the WB adjustment unit 90 changes and adjusts the white balance of the image based on the adjusted image data displayed in the image display portion 80 and generates image data (hereinafter, referred to as "changed image data") in which a change in the light source to a new light source designated by the user is reflected.

Then, the display control unit 35 displays an image based on the changed image data of which the white balance has been changed and adjusted by the WB adjustment unit 90 in the image display portion 80 of the display unit 8.

Instead of the light source, the influence rate of the light source designated by the user may be changed. That is, in a case in which a plurality of light source display portions 82 are displayed on the display unit 8, when any one of the plurality of light source display portions 82 is designated by the user through the operating unit 9, the display control unit 35 may display a change display portion 88, which receives a change in the influence rate of the light source corresponding to the light source display portion 82 designated through the operating unit 9, in the image display portion. Then, the display control unit 35 may receive the amount of change in the "influence rate of the light source corresponding to the designated light source display 82" in the image through the change display portion in response to an operation of the user through the operating unit 9. In the example illustrated in FIG. 23, the display control unit 35 may display a percentage in the range of, for example, "0%" to "100%" on the display unit 8 in any aspect, instead of displaying "daylight", "shade", a "fluorescent light", and a "light bulb" in the change display portion 88. In this case, the user can select any percentage displayed in the change display portion 88 through the operating unit 9. The percentage selected by the user may be used as the "amount of change in the influence rate of the light source corresponding to the designated light source display portion 82.

In this case, the WB adjustment unit 90 (see FIG. 22) adjusts the white balance of the image based on the adjusted image data, reflects the amount of change in the influence rate received by the display control unit 35 through the light source display portion 82 in the image, and generate changed image data. Then, the display control unit 35 displays an image based on the changed image data of which the white balance has been changed and adjusted by the WB adjustment unit 90 in the image display portion 80 of the display unit 8.

As described above, according to this embodiment, the user can change the white balance of the image for each light source. In particular, the display unit 8 (image display portion 80) displays the pixel on which the influence rate of the light source designated as a change target is high so as to be highlighted. Therefore, the user can easily determine a part of the image of which the color (color balance) is to be changed.

Modification Examples

Among the above-described embodiments and modification examples, any embodiments and modification examples may be combined with each other. The above-described embodiments are illustrative and the invention may be applied to other structures. Each of the above-mentioned functional structures can be implemented by any hardware, software, or a combination thereof. For example, the invention can also be applied to a program that causes a computer to perform an image processing method (image processing procedure) in each of the above-mentioned devices and processing units (for example, the data processing unit 31), a computer-readable storage medium (non-transitory storage medium) that stores the program, or a computer in which the program can be installed.

The aspects to which the invention can be applied are not limited to the digital camera and the computer (server). The invention can also be applied to cameras having an imaging function as a main function and mobile devices having functions (a calling function, a communication function, and other computer functions) other than the imaging function in addition to the imaging function. Other aspects to which the invention can be applied are, for example, mobile phones, smart phones, personal digital assistants (PDAs), and portable game machines with a camera function. Hereinafter, an example of the smart phone to which the invention can be applied will be described.

<Structure of Smart Phone>

Figure 24:
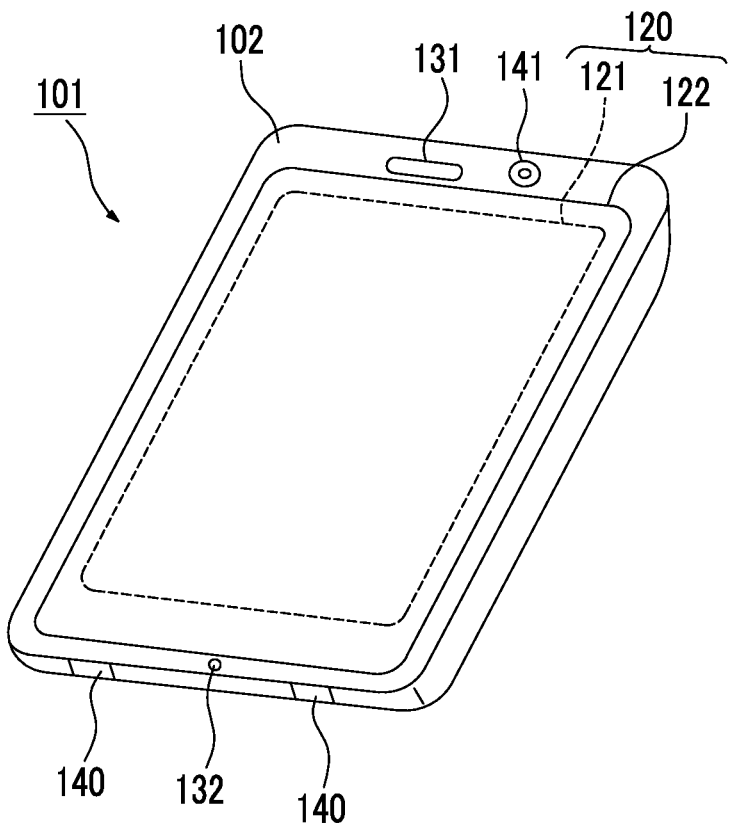
FIG. 24 is a diagram illustrating the outward appearance of a smart phone.

FIG. 24 is a diagram illustrating the outward appearance of a smart phone 101. The smart phone 101 illustrated in FIG. 24 comprises a housing 102 with a flat panel shape and a display input unit 120 having a display panel 121 as a display unit and an operation panel 122 as an input unit which are integrally formed on one surface of the housing 102. The housing 102 comprises a speaker 131, a microphone 132, an operating unit 140, and a camera unit 141. However, the configuration of the housing 102 is not limited thereto. For example, the display unit and the input unit may be independently provided, or the housing 102 may have a folding structure or a sliding structure.

Figure 25:
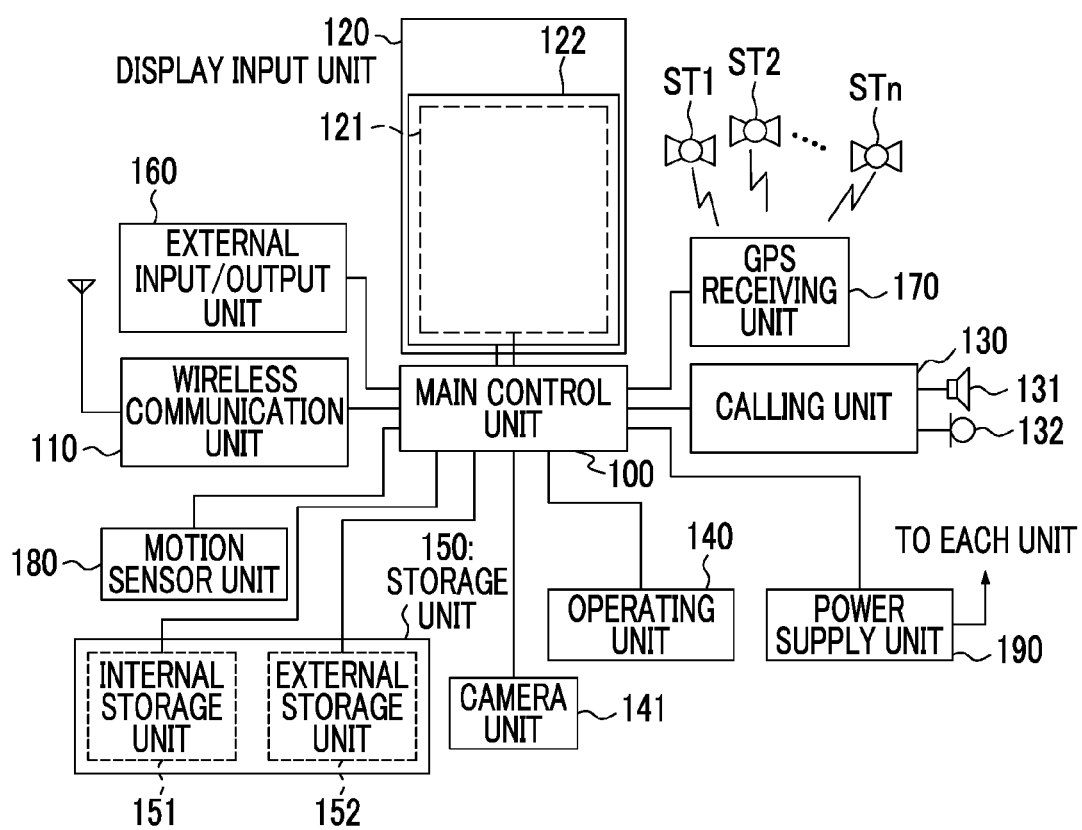
FIG. 25 is a block diagram illustrating the structure of the smart phone illustrated in FIG. 24.

FIG. 25 is a block diagram illustrating an example of the structure of the smart phone 101 illustrated in FIG. 24. As illustrated in FIG. 25, the smart phone 101 comprises, as main components, a wireless communication unit 110, the display input unit 120, a calling unit 130, the operating unit 140, the camera unit 141, a storage unit 150, an external input/output unit 160, a global positioning system (GPS) receiving unit 170, a motion sensor unit 180, a power supply unit 190, and a main control unit 100. The smart phone 101 has, as a main function, a wireless communication function which performs mobile wireless communication through a base station apparatus and a mobile communication network.

The wireless communication unit 110 performs wireless communication with the base station apparatus which is accommodated in the mobile communication network in response to an instruction from the main control unit 100. The wireless communication is used to transmit and receive various types of file data, such as voice data and image data, and electronic mail data or to receive, for example, web data and streaming data.

The display input unit 120 is a so-called touch panel that displays, for example, images (still images and moving images) or text information to visually transmit information to the user and detects the user's operation for the displayed information under the control of the main control unit 100 and comprises the display panel 121 and the operation panel 122.

The display panel 121 uses, for example, a liquid crystal display (LCD) or an organic electro-luminescence display (OELD) as a display device. The operation panel 122 is a device that is provided such that an image displayed on a display surface of the display panel 121 is visually recognized and detects coordinates operated by a finger of the user or a stylus. When the device is operated by a finger of the user or a stylus, a detection signal which is generated by the operation is output to the main control unit 100. Then, the main control unit 100 detects an operation position (coordinates) on the display panel 121 on the basis of the received detection signal.

As illustrated in FIG. 24, the display panel 121 and the operation panel 122 of the smart phone 101 which is an embodiment of the imaging device according to the invention are integrated to form the display input unit 120 and the operation panel 122 is arranged so as to completely cover the display panel 121. In a case in which this arrangement is used, the operation panel 122 may have a function of detecting the user's operation even in a region other than the display panel 121. In other words, the operation panel 122 may comprise a detection region (hereinafter, referred to as a display region) for an overlap portion which overlaps the display panel 121 and a detection region (hereinafter, referred to as a non-display region) for an outer edge portion which does not overlap the display panel 121.

The size of the display region may be exactly equal to the size of the display panel 121. However, the sizes are not necessarily equal to each other. The operation panel 122 may comprise two sensitive regions, that is, an outer edge portion and an inner portion other than the outer edge portion. The width of the outer edge portion is appropriately designed according to, for example, the size of the housing 102. Examples of a position detecting method which is used in the operation panel 122 include a matrix switching method, a resistive film method, a surface elastic wave method, an infrared method, an electromagnetic induction method, and a capacitive sensing method. Any of the methods may be used.

The calling unit 130 comprises the speaker 131 and the microphone 132. The calling unit 130 converts the voice of the user which is input through the microphone 132 into voice data which can be processed by the main control unit 100 and outputs the converted voice data to the main control unit 100. In addition, the calling unit 130 decodes voice data received by the wireless communication unit 110 or the external input/output unit 160 and outputs the decoded voice data from the speaker 131. As illustrated in FIG. 24, for example, the speaker 131 can be mounted on the same surface as the display input unit 120 and the microphone 132 can be mounted on a side surface of the housing 102.

The operating unit 140 is a hardware key which uses, for example, a key switch and receives instructions from the user. For example, as illustrated in FIG. 24, the operating unit 140 is a push button switch which is mounted on the side surface of the housing 102 of the smart phone 101, is turned on when it is pressed by, for example, a finger, and is turned off by the restoring force of a spring when the finger is taken off.

The storage unit 150 stores a control program or control data of the main control unit 100, application software, address data which is associated with, for example, the names or phone numbers of communication partners, transmitted and received electronic mail data, web data which is downloaded by web browsing, and downloaded content data. In addition, the storage unit 150 temporarily stores, for example, streaming data. The storage unit 150 includes an internal storage unit 151 which is provided in the smart phone and an external storage unit 152 which has a detachable external memory slot. The internal storage unit 151 and the external storage unit 152 forming the storage unit 150 are implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 160 functions as an interface with all of the external apparatuses connected to the smart phone 101 and is directly or indirectly connected to other external apparatuses by communication (for example, universal serial bus (USB) communication or IEEE1394 defined by the Institute of Electrical and Electronics Engineers, Inc. (IEEE)) or a network (for example, the Internet, a wireless local area network (LAN), a Bluetooth (registered trademark) network, a radio frequency identification (RFID) network, an infrared data association (IrDA) (registered trademark) network, an ultra wideband (UWB) (registered trademark) network, or a ZigBee (registered trademark) network).

Examples of the external apparatus connected to the smart phone 101 include a wired/wireless headset, a wired/wireless external charger, a wired/wireless data port, a memory card or a subscriber identity module (SIM) card/user identity module (UIM) card which is connected through a card socket, an external audio/video apparatus which is connected through audio/video input/output (I/O) terminals, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit may transmit data which is received from the external apparatus to each component of the smart phone 101 or may transmit data in the smart phone 101 to the external apparatus.

The GPS receiving unit 170 receives GPS signals transmitted from GPS satellites ST1 to STn and performs a position measurement process on the basis of the received GPS signals to detect a position including the latitude, longitude, and height of the smart phone 101, in response to an instruction from the main control unit 100. In a case in which the GPS receiving unit 170 can acquire positional information from the wireless communication unit 110 or the external input/output unit 160 (for example, the wireless LAN), the GPS receiving unit 170 can detect the position using the positional information.

The motion sensor unit 180 comprises, for example, a triaxial acceleration sensor and detects the physical movement of the smart phone 101 in response to an instruction from the main control unit 100. When the physical movement of the smart phone 101 is detected, the moving direction or acceleration of the smart phone 101 is detected. The detection result is output to the main control unit 100.

The power supply unit 190 supplies power which is stored in a battery (not illustrated) to each unit of the smart phone 101 in response to an instruction from the main control unit 100.

The main control unit 100 comprises a microprocessor, operates on the basis of the control program or control data stored in the storage unit 150, and controls the overall operation of each unit of the smart phone 101. The main control unit 100 has an application processing function and a mobile communication control function of controlling each unit of a communication system in order to perform voice communication or data communication through the wireless communication unit 110.

The application processing function is implemented by the operation of the main control unit 100 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The main control unit 100 has, for example, an image processing function which displays an image on the display input unit 120 on the basis of image data (still image or moving image data) such as received data or downloaded streaming data. The image processing function means the function of the main control unit 100 decoding the image data, performing image processing on the decoding result, and displaying the image on the display input unit 120.

The main control unit 100 performs display control for the display panel 121 and operation detection control for detecting the operation of the user through the operating unit 140 and the operation panel 122.

The main control unit 100 performs the display control to display a software key, such as an icon for starting application software or a scroll bar, or to display a window for writing electronic mail. The scroll bar means a software key for receiving an instruction to move a displayed portion of an image that is too large to fit into the display region of the display panel 121.

The main control unit 100 performs the operation detection control to detect the operation of the user input through the operating unit 140, to receive an operation for the icon or the input of a character string to an input field of the window through the operation panel 122, or to receive a request to scroll the displayed image through the scroll bar.

In addition, the main control unit 100 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 100 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which captures an image using an imaging element such as a CMOS. In addition, the camera unit 141 can convert captured image data into image data which is compressed in, for example, a JPEG format, stores the converted image data in the storage unit 150, and outputs the converted image data through the external input/output unit 160 or the wireless communication unit 110, under the control of the main control unit 100. As illustrated in FIG. 24, the camera unit 141 is mounted on the same surface as the display input unit 120 in the smart phone 101. However, the mounting position of the camera unit 141 is not limited thereto. For example, the camera unit 141 may be mounted on the rear surface of the display input unit 120 or a plurality of camera units 141 may be mounted. In a case in which a plurality of camera units 141 are mounted, the camera units 141 which are used to capture images may be switched such that a single camera unit captures images or the plurality of camera units 141 may be simultaneously used to capture images.

The camera unit 141 can be used for various functions of the smart phone 101. For example, the image captured by the camera unit 141 can be displayed on the display panel 121 or the image captured by the camera unit 141 can be used as one of the operation inputs of the operation panel 122. When the GPS receiving unit 170 detects the position, the position may be detected with reference to the image from the camera unit 141. In addition, the optical axis direction of the camera unit 141 in the smart phone 101 may be determined or the current usage environment may be determined, with reference to the image from the camera unit 141, using the triaxial acceleration sensor or without using the triaxial acceleration sensor. Of course, the image from the camera unit 141 may be used in the application software.

For example, the positional information which is acquired by the GPS receiving unit 170, the voice information which is acquired by the microphone 132 (for example, the main control unit may convert the voice information into text information), and the posture information which is acquired by the motion sensor unit 180 may be added to the image data of a still image or a moving image and the image data may be stored in the storage unit 150 and may be output through the external input/output unit 160 or the wireless communication unit 110.

The image processing unit 38 (see FIGS. 4, 6, 8, 12, 14, 16, 18, and 22) may be implemented by, for example, the main control unit 100.

EXPLANATION OF REFERENCES

2: digital camera
3: camera body
4: lens barrel
5: flash light emitting unit
6: shutter button
7: power switch
8: display unit
9: operating unit
10: main memory
12: lens unit
20: mechanical shutter
21: imaging element
22: process processing unit
23: A/D conversion unit
24: buffer memory
25: system control unit
26: shutter driving unit
27: lens driving unit
28: power supply control unit
29: power supply
30: control memory
31: data processing unit
32: compression and decompression unit
33: storage control unit
34: clock device
35: display control unit
36: user interface
38: image processing unit
40: light source type determination unit
42: gain acquisition unit
44: mixture ratio acquisition unit
46: flash image acquisition unit
48: setting mode determination unit
60: processed data acquisition unit
62: gain calculation unit
64: WB processing unit
66: setting mode acquisition unit
68: processing mode acquisition unit
70: processing mode input unit
72: light source type designation unit
74: designated gain acquisition unit
76: light source type input unit
80: image display portion
82: light source display
84: highlighting designation portion
86: highlighted portion
88: change display
90: WB adjustment unit
91: computer
92: server
94: network
96: portable terminal
100: main control unit
101: smart phone
102: housing
110: wireless communication unit
120: display input unit
121: display panel
122: operation panel
130: calling unit
131: speaker
132: microphone
140: operating unit
141: camera unit
150: storage unit
151: internal storage unit
152: external storage unit
160: external input/output unit
170: GPS receiving unit
180: motion sensor unit
190: power supply unit

What is claimed is:

1. An image processing device comprising:
a processor configured to:
determine a number of light sources in original image data and the types of each light source;
acquire a reference white balance gain which is set for each light source type of the original image data;
acquire an influence rate of each light source type for each pixel of the original image data and acquire a mixture ratio of the reference white balance gains on the basis of the influence rate; and
store the reference white balance gains and the mixture ratio in a storage medium so as to be associated with the original image data.

2. The image processing device according to claim 1, wherein the processor is further configured to:

determine that the light sources of the original image data are flash light and environmental light, acquire a reference white balance gain for flash light which is set in a case in which the light source type is the flash light and a reference white balance gain for environmental light which is set in a case in which the light source type is the environmental light, acquire the influence rate of each of the flash light and the environmental light for each pixel of the original image data and acquire the mixture ratio of the reference white balance gain for flash light and the reference white balance gain for environmental light on the basis of the influence rate, and store the reference white balance gain for flash light, the reference white balance gain for environmental light, and the mixture ratio in the storage medium so as to be associated with the original image data.

3. The image processing device according to claim 2, wherein the processor is further configured to:

acquire flash emission image data which is captured while flash light is emitted and flash non-emission image data which is captured when flash light is not emitted, and acquire the influence rate of each of the flash light and the environmental light from the flash emission image data and the flash non-emission image data and acquire the mixture ratio of the reference white balance gain for flash light and the reference white balance gain for environmental light on the basis of the influence rate.

4. The image processing device according to claim 3, wherein the processor is further configured to acquire a first brightness value of each pixel of the flash non-emission image data, acquire a second brightness value of each pixel of the flash emission image data, acquire the influence rate of each of the flash light and the environmental light on the basis of the first brightness value and the second brightness value, and acquire the mixture ratio of the reference white balance gain for flash light and the reference white balance gain for environmental light on the basis of the influence rate.

5. The image processing device according to claim 3, wherein the original image data is the flash emission image data.

6. The image processing device according to claim 1, wherein the processor is further configured to:

acquire first image data indicating an influence of a first light source type and second image data indicating an influence of a second light source type, wherein, in a case in which the light source types of the original image data determined by the processor include the first light source type and the second light source type, the processor is further configured to:

acquire the reference white balance gain set for the first light source type and the reference white balance gain set for the second light source type, acquire the influence rate of the first light source type and the second light source type from the first image data and the second image data and acquire the mixture ratio of the reference white balance gain set for the first light source type and the reference white balance gain set for the second light source type on the basis of the influence rate, and store the reference white balance gain set for the first light source type, the reference white balance gain set for the second light source type, and the mixture ratio in the storage medium so as to be associated with the original image data.

7. The image processing device according to claim 1, wherein, regardless of a white balance setting mode when the original image data is acquired, the processor is further configured to:

determine the number of light sources of the original image data and the types of light source, acquire the reference white balance gain set for each light source type, acquire the influence rate of each light source type for each pixel of the original image data and acquire the mixture ratio of the reference white balance gains on the basis of the influence rate, and store the reference white balance gains and the mixture ratio in the storage medium so as to be associated with the original image data.

8. The image processing device according to claim 7, wherein the white balance setting mode is any one of a preset white balance mode in which the white balance gain is preset, an auto white balance mode in which the white balance gain applied to the original image data is determined on the basis of color distribution information of the original image data, and a custom white balance mode in which the white balance gain applied to the original image data is determined on the basis of color distribution information of reference image data which is different from the original image data.

9. The image processing device according to claim 1, wherein the processor is further configured to:

determine a white balance setting mode when the original image data is acquired, wherein, only in a case in which the white balance setting mode determined by the processor is an auto white balance mode in which a white balance gain applied to the original image data is determined on the basis of color distribution information of the original image data, the processor is further configured to:

determine the number of light sources of the original image data and the types of light source, acquire the reference white balance gain set for each light source type, acquire the influence rate of each light source type for each pixel of the original image data and acquire the mixture ratio of the reference white balance gains on the basis of the influence rate, and store the reference white balance gains and the mixture ratio in the storage medium so as to be associated with the original image data.

* * * * *